United States Patent
Hagihara

(10) Patent No.: US 9,343,902 B2
(45) Date of Patent: May 17, 2016

(54) UNINTERRUPTIBLE POWER SUPPLY APPARATUS AND CONTROL METHOD

(75) Inventor: Yasuhiko Hagihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 391 days.

(21) Appl. No.: 14/114,069

(22) PCT Filed: Mar. 9, 2012

(86) PCT No.: PCT/JP2012/001672
§ 371 (c)(1),
(2), (4) Date: Oct. 25, 2013

(87) PCT Pub. No.: WO2012/147263
PCT Pub. Date: Nov. 1, 2012

(65) Prior Publication Data
US 2014/0049104 A1 Feb. 20, 2014

(30) Foreign Application Priority Data
Apr. 26, 2011 (JP) ................. 2011-097934

(51) Int. Cl.
*H02J 1/00* (2006.01)
*H02J 9/06* (2006.01)
*H02M 1/10* (2006.01)
*H02M 3/158* (2006.01)

(52) U.S. Cl.
CPC . *H02J 1/00* (2013.01); *H02J 9/061* (2013.01); *H02J 9/062* (2013.01); *H02M 1/10* (2013.01); *H02M 3/158* (2013.01); *Y10T 307/344* (2015.04)

(58) Field of Classification Search
None
See application file for complete search history.

(56) References Cited

U.S. PATENT DOCUMENTS

| 2002/0033692 A1 | 3/2002 | Sakai et al. | |
| 2002/0135328 A1* | 9/2002 | Hanaoka | H02J 9/062 318/37 |
| 2005/0162137 A1* | 7/2005 | Tracy | H02J 9/062 323/217 |

FOREIGN PATENT DOCUMENTS

| JP | 02-193544 A | 7/1990 |
| JP | 4193033 A | 7/1992 |
| JP | 9237640 A | 9/1997 |
| JP | 11-18318 A | 1/1999 |
| JP | 2000-121710 A | 4/2000 |
| JP | 2000-152515 A | 5/2000 |
| JP | 2001245443 A | 9/2001 |
| JP | 2002-191138 A | 7/2002 |
| JP | 2002-252971 A | 9/2002 |

(Continued)

OTHER PUBLICATIONS

Communication dated Dec. 15, 2015, issued by the Japan Patent Office in corresponding Japanese Application No. 2013-511887.

*Primary Examiner* — Jared Fureman
*Assistant Examiner* — Aqeel Bukhari
(74) *Attorney, Agent, or Firm* — Sughrue Mion, PLLC

(57) ABSTRACT

A second DC power-supply voltage that is obtained by outputting a first DC power-supply voltage obtained by converting an AC power supply into a direct current in an AC-DC converter circuit, through a first switch for PWM switching is smoothed and fed to a load as an output DC power-supply voltage. The first DC power-supply voltage is also supplied to a battery through a third switch for PWM switching and the battery is thereby charged. Further, a third power-supply voltage output from the battery is output to the output side of the first switch through a fourth switch for PWM switching.

10 Claims, 8 Drawing Sheets

(56) References Cited

FOREIGN PATENT DOCUMENTS

| | | |
|---|---|---|
| JP | 2005-224047 A | 8/2005 |
| JP | 2006-271074 A | 10/2006 |
| JP | 2007-294322 A | 11/2007 |

\* cited by examiner

UNINTERRUPTIBLE POWER SUPPLY APPARATUS AND CONTROL METHOD

CROSS REFERENCE TO RELATED APPLICATIONS

This is a National Stage of International Application No. PCT/JP2012/001672, filed Mar. 9, 2012, claiming priority from Japanese Patent Application No. 2011-097934, filed Apr. 26, 2011, the contents of all of which are incorporated herein by reference in their entirety.

TECHNICAL FIELD

The present invention relates to an uninterruptible power supply apparatus and control method, in particular to an uninterruptible power supply apparatus equipped with a secondary battery and thereby capable of continuing the supply of electric power even when a temporary power failure occurs, and its control method.

BACKGROUND ART

A power failure or a temporary drop in power-supply voltage often causes not only an interruption of operations of electronic devices in use, but also a more significant problem such as the corruption of stored data and mechanical failures.

Therefore, Japanese Unexamined Patent Application Publication No. 2006-271074 (Patent literature 1) "UNINTERRUPTIBLE POWER SUPPLY SYSTEM" proposes an uninterruptible power supply apparatus equipped with a secondary battery (battery) and thereby capable of continuing the supply of electric power even when a temporary power failure occurs. Further, the secondary battery mounted in the apparatus needs to be kept in a charged state. Further, since the secondary battery deteriorates with time, it is necessary to measure the degree of the deterioration as required and to replace it with new one at regular intervals. Japanese Unexamined Patent Application Publication No. 2000-121710 (Patent literature 2) "BATTERY CONTROL DEVICE FOR BACKUP POWER SUPPLY AND METHOD FOR DIAGNOSING DETERIORATION OF SECONDARY BATTERY" proposes a secondary battery deterioration measurement technique that makes it possible to estimate the degree of deterioration of a secondary battery by causing a pulse discharge with a constant current and measuring the battery voltage before and during the discharge.

CITATION LIST

Patent Literature

Patent literature 1: Japanese Unexamined Patent Application Publication No. 2006-271074 (pages 4-6)
Patent literature 2: Japanese Unexamined Patent Application Publication No. 2000-121710 (pages 3-4)

SUMMARY OF INVENTION

Technical Problem

As described above, it has been widely recognized that a power failure and a temporary drop in power-supply voltage have significant influences on an electronic device. Therefore, uninterruptible power supply apparatuses have been increasingly introduced as power supply apparatuses. However, their prevalence rate to household electrical appliances is very low. The main reasons for the low prevalence rate are that uninterruptible power supply apparatuses are expensive and that their circuit size and the volume of the apparatus are large.

FIG. 8 shows a block configuration diagram showing a configuration of a non-stop power supply apparatus equipped with a secondary battery that is usually used in a notebook-sized personal computer or the like. The non-stop power supply apparatus shown in FIG. 8 includes a filter 1002 that receives commercial alternating-current power supply (AC power supply) 1001 through an AC power-supply line and removes noise from the AC power supply, and an AC-DC converter circuit 1003 that converts the AC power supply supplied from the filter 1002 into a DC (Direct Current) power-supply voltage 1011 having a DC voltage of 3V to 48V. Further, the non-stop power supply apparatus also includes a power-failure determination circuit 1004 that receives the DC power-supply voltage 1011 on an output power-supply line from the AC-DC converter circuit 1003 and determines the occurrence/non-occurrence of a power failure, and a deterioration detection/charge control circuit 1005 that detects voltage-level deterioration and controls a charging operation.

Further, the non-stop power supply apparatus also includes a secondary battery 1006 that receives a DC power-supply voltage 1012 on an output power-supply line from the deterioration detection/charge control circuit 1005, performs a charging operation, and performs, at the time of a power failure, a discharging operation as a backup power supply. Further, the non-stop power supply apparatus also includes a selector 1007 that selects the DC power-supply voltage 1011 on the output power-supply line from the AC-DC converter circuit 1003 or a DC power-supply voltage 1013 on an output power-supply line from the secondary battery 1006 according to a power-failure determination signal 1014 on an output signal line from the power-failure determination circuit 1004.

Further, the non-stop power supply apparatus also includes a first DC-DC converter circuit 1008 that receives a DC power-supply voltage 1015 on an output power-supply line from the selector 1007 and converts the received DC power-supply voltage into a DC voltage of 12V, a second DC-DC converter circuit 1009 that receives an output DC power-supply voltage 1016 on a power-supply output line from the first DC-DC converter circuit 1008, and generates and outputs a DC voltage of 5V as DC power supply of a difference voltage or a different line, and a third DC-DC converter circuit 1010 that generates and outputs a DC voltage of 1.5V.

That is, the non-stop power supply apparatus shown in FIG. 8 receives the commercial AC power supply having a 100-200V AC voltage of 50-60 Hz on an AC power-supply line, i.e., receives the AC power-supply 1001, and outputs three types of DC power-supply voltages including the output DC power-supply voltage 1016 of 12V from the first DC-DC converter circuit 1008, the output DC power-supply voltage 1017 of 5V from the second DC-DC converter circuit 1009, and the output DC power-supply voltage 1018 of 1.5V from the third DC-DC converter circuit 1010.

As shown in the non-stop power supply apparatus in FIG. 8, there has been a problem that when the power-failure determination circuit 1004 and the deterioration detection/charge control circuit 1005 operate independently of each other, the electric power consumed for the deterioration detection of the secondary battery cannot be reused, and thus lowering the conversion efficiency of the power-supply apparatus.

The present invention has been made to solve the above-described problem and provides an uninterruptible power supply apparatus and its control method capable of improving the conversion efficiency of the power-supply apparatus.

Solution to Problem

To solve the above-described problem, an uninterruptible power supply apparatus according to the present invention adopts, mainly, the following characteristic configuration.

An uninterruptible power supply apparatus according to the present invention includes at least:

an AC-DC converter circuit that receives AC power supply, converts the received AC power supply into a DC power-supply voltage, and outputs the converted DC power-supply voltage as a first DC power-supply voltage;

a first switch that performs an on/off action with a predetermined pulse width for the first DC power-supply voltage output from the AC-DC converter circuit based on a first control signal supplied from a driver and thereby outputs as a second DC power-supply voltage having a sawtooth wave shape, or becomes an off-state and thereby cuts off an output;

a smoothing circuit that smoothes the second DC power-supply voltage and feeds the smoothed DC power-supply voltage as an output DC power-supply voltage to a load side, the smoothing circuit including an inductance and a capacitor;

a second switch that becomes an on-state based on a second control signal supplied from the driver, drops the second DC power-supply voltage to a ground potential, and thereby stops outputting the second DC power-supply voltage to the smoothing circuit, or becomes an off-state and thereby outputs the second DC power-supply voltage to the smoothing circuit; and a secondary battery for backup, in which the uninterruptible power supply apparatus further includes at least:

a third switch that performs an on/off action with a specified pulse width for the first DC power-supply voltage output from the AC-DC converter circuit based on a third control signal supplied from the driver and thereby outputs as a third DC power-supply voltage having a sawtooth wave shape, or becomes an off-state and thereby cuts off an output;

a fourth switch that performs an on/off action with a specified pulse width for a battery voltage output from the secondary battery based on a fourth control signal supplied from the driver and thereby outputs as the second DC power-supply voltage, instead of or together with the first DC power-supply voltage output from the AC-DC converter circuit, to an output side of the first switch, or becomes an off-state and thereby cuts off an output, the secondary battery being connected between an output side of the third switch and a ground potential;

a first analog-digital converter circuit that converts a voltage value of the output DC power-supply voltage into a first digital signal;

a second analog-digital converter circuit that converts a voltage value of the battery voltage into a second digital signal;

a third analog-digital converter circuit that converts a voltage value of the first DC power-supply voltage into a third digital signal; and a processor that generates a control signal for the driver based on the first to third digital signals output from the first to third analog-digital converter circuits and an externally-supplied input control signal, outputs the generated control signal to the driver, and thereby makes the driver output the first to fourth control signals to the first to fourth switches.

To solve the above-described problem, a control method for an uninterruptible power supply apparatus according to the present invention adopts, mainly, the following characteristic steps.

A control method for an uninterruptible power supply apparatus according to the present invention includes at least:

a step of performing, by a first switch, performing an on/off action with a predetermined pulse width for a first DC power-supply voltage based on a first control signal supplied from a driver and thereby outputting as a second DC power-supply voltage having a sawtooth wave shape, or turning off the first switch and thereby cutting off an output;

a step of dropping, by a second switch, the second DC power-supply voltage to a ground potential based on a second control signal supplied from the driver, or smoothing the second DC power-supply voltage and feeding the smoothed DC power-supply voltage as an output DC power-supply voltage to a load side;

a step of performing, by a third switch, an on/off action with a specified pulse width for the first DC power-supply voltage based on a third control signal supplied from the driver and thereby outputting as a third DC power-supply voltage having a sawtooth wave shape, or turning off the third switch and thereby cutting off an output; and a step of performing, by a fourth switch, an on/off action with a specified pulse width for a battery voltage output from a secondary battery based on a fourth control signal supplied from the driver and thereby outputting as the second DC power-supply voltage, instead of or together with the first DC power-supply voltage, to an output side of the first switch, or turning off the fourth switch and thereby cutting off an output.

Advantageous Effects of Invention

According to the present invention, it is possible to reuse electric power that is consumed to measure the characteristic of a secondary battery, which deteriorates with time, and supply the reused electric power to the load side, and thereby to realize an uninterruptible power supply apparatus and its control method having high conversion efficiency.

BRIEF DESCRIPTION OF DRAWINGS

FIG. 8 shows a block configuration diagram showing a configuration of a non-stop power supply apparatus equipped with a secondary battery that is usually used in a notebook-sized personal computer or the like.

DESCRIPTION OF EMBODIMENTS

Preferable exemplary embodiments of an uninterruptible power supply apparatus and its control method according to the present invention are explained hereinafter with reference to the drawings.

Feature of the Invention

Prior to the explanation of exemplary embodiments according to the present invention, firstly, general features of the present invention are explained. One of the principal features of the present invention is that the present invention can make it possible to improve the amount of electric power conversion per volume by minimizing the circuit size and to reuse electric power that is consumed for measuring the characteristic of a secondary battery, which deteriorates with time, and supply the reused electric power to an electric device(s) on the load side, and thereby to realize an uninterruptible power supply apparatus having high conversion efficiency.

Configuration Example of Exemplary Embodiment of the Invention

Figure 1:
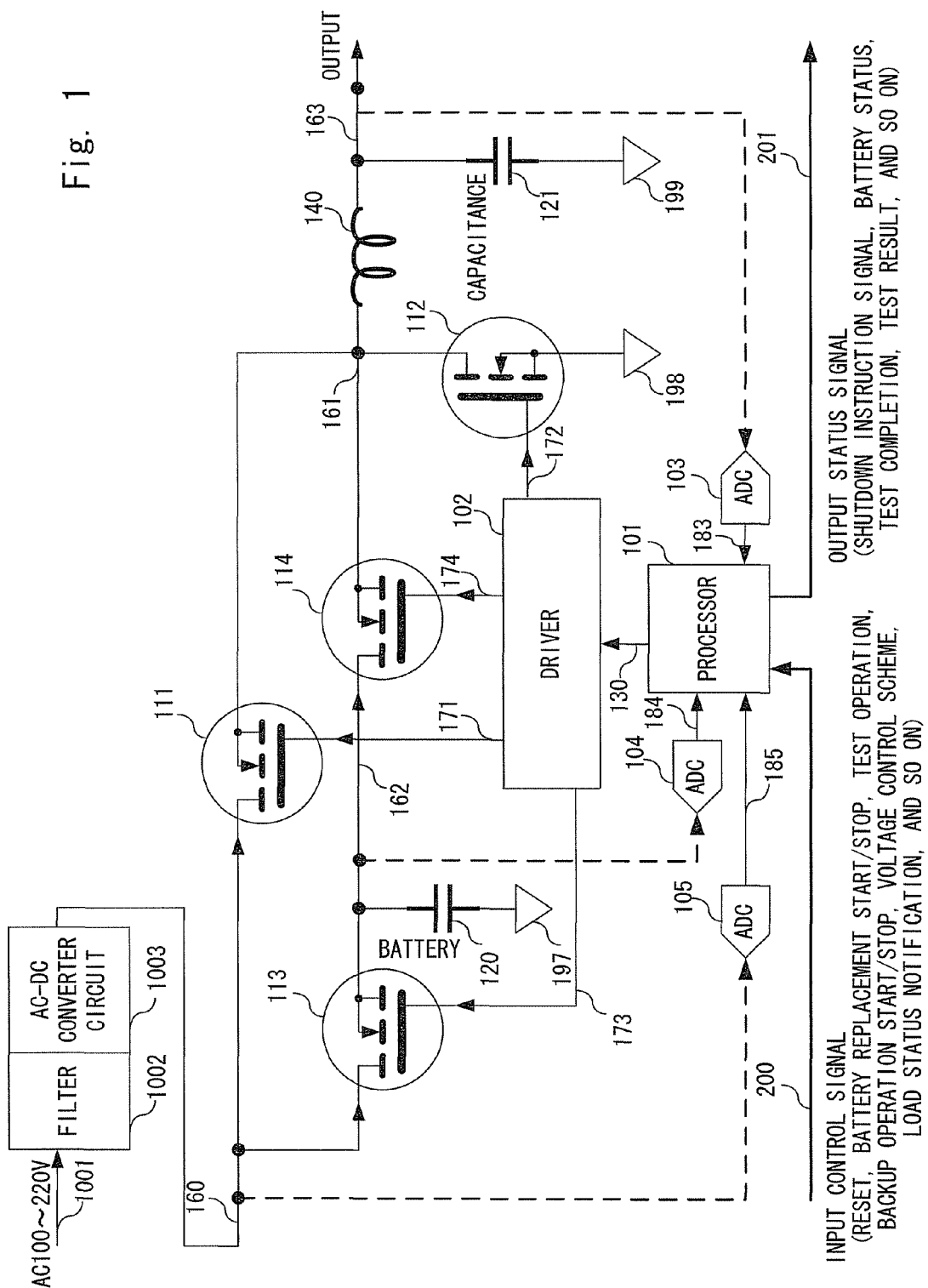
FIG. 1 is a block configuration diagram showing an example of a block configuration of an uninterruptible power supply apparatus according to the present invention.

Next, a configuration example of an uninterruptible power supply apparatus according to the present invention is explained with reference to FIG. 1. FIG. 1 is a block configuration diagram showing an example of a block configuration of an uninterruptible power supply apparatus according to the present invention.

In the uninterruptible power supply apparatus shown in FIG. 1, commercial alternating-current power supply (AC power supply) 1001 having an AC voltage of 100-200V supplied through an AC power-supply line is supplied to an AC-DC converter circuit 1003 through a filter 1002 for removing noise. The AC-DC converter circuit 1003 converts AC power supply output from the filter 1002 and outputs the converted AC power supply as a first DC power-supply voltage 160.

Further, a first switch 111 receives a first control signal 171 from a driver 102 as its control signal, receives the first DC power-supply voltage 160 from the AC-DC converter circuit 1003, performs on/off actions with a predetermined pulse width, and thereby outputs a second DC power-supply voltage 161 having a sawtooth wave shape, or becomes an off-state and thereby cuts off the output. A third switch 113 receives a third control signal 173 from the driver 102 as its control signal, receives the first DC power-supply voltage 160 from the AC-DC converter circuit 1003, performs on/off actions with a specified pulse width, and thereby outputs a third DC power-supply voltage 162, or becomes an off-state and thereby cuts off the output.

Further, a fourth switch 114 receives a fourth control signal 174 from the driver 102 as its control signal, receives the third DC power-supply voltage 162 from the third switch 113, i.e., a battery voltage output from a battery 120, performs on/off actions with a specified pulse width, and thereby outputs the resultant power-supply voltage as the second DC power-supply voltage 161, instead of or together with the first DC power-supply voltage 160 output from the AC-DC converter circuit 1003, to the output side of the first switch 111, or becomes an off-state and thereby cuts off the output. A second switch 112 receives a second control signal 172 from the driver 102 as its control signal, receives the second DC power-supply voltage 161 from the first and fourth switches 111 and 114, and outputs a second ground potential 198. That is, the second switch 112 becomes an off-state according to the second control signal 172 and thereby allows the first and fourth switches 111 and 114 to output the second DC power-supply voltage 161, or becomes an on-state, drops the second DC power-supply voltage 161 to the ground potential of the second ground potential 198, and thereby stops the output.

The battery 120 is a secondary battery (battery) capable of being recharged. The positive terminal of the battery 120 is connected to a power-supply line through which the third DC power-supply voltage 162 is output from the third switch 113, and the negative terminal is connected to a first ground potential 197. A processor 101 receives an external input control signal 200 as its control signal, receives a first digital signal 183, a second digital signal 184, and a third digital signal 185 from a first analog-digital converter circuit 103, a second analog-digital converter circuit 104, and a third analog-digital converter circuit 105 respectively, and outputs a control signal 130 for the driver 102 and an external output status signal 201.

Note that the input control signal 200 input to the processor 101 is composed of various information items for controlling the uninterruptible power supply apparatus such as a reset, a start/stop of replacement of the secondary battery (battery), i.e., the battery 120, a test operation, a start/stop of a backup operation, a voltage control scheme, and a load status notification. Meanwhile, the output status signal 201 output from the processor 101 is composed of various status information items for indicating the status and/or the instruction information of the uninterruptible power supply apparatus such as a shutdown instruction signal, a status of the secondary battery (battery), i.e., the battery 120, test completion, and a test result.

The driver 102 receives the control signal 130 from the processor 101, and outputs the first control signal 171, the second control signal 172, the third control signal 173, and the fourth control signal 174 to the first switch 111, the second switch 112, the third switch 113, and the fourth switch 114 respectively.

The first analog-digital converter circuit 103 reads the voltage value of a last-stage output DC power-supply voltage 163 to be output to the load side, converts the read voltage value into a digital value, and outputs the converted digital value as the first digital signal 183 to the processor 101. The second analog-digital converter circuit 104 reads the voltage value of the third DC power-supply voltage 162 output from the third switch 113, i.e., the voltage value at the positive terminal of the battery 120, converts the read voltage value into a digital value, and outputs the converted digital value as the second digital signal 184 to the processor 101. The third analog-digital converter circuit 105 reads the voltage value of the first DC power-supply voltage 160 output from the AC-DC converter circuit 1003, converts the read voltage value into a digital value, and outputs the converted digital value as the third digital signal 185 to the processor 101.

An inductance 140 is connected between a power-supply line through which the second DC power-supply voltage 161 is output from the first and fourth switches 111 and 114 and an output power-supply line through which the last-stage output DC power-supply voltage 163 is output. The positive terminal of a capacitor 121 is connected to the output power-supply line through which the last-stage output DC power-supply voltage 163 is output, and the negative terminal is connected to a third ground potential 199. That is, the inductance 140 and the capacitor 121 forms a smoothing circuit that smoothes the second DC power-supply voltage 161 having a sawtooth wave shape and thereby outputs the smoothed output DC power-supply voltage 163.

Figure 2:
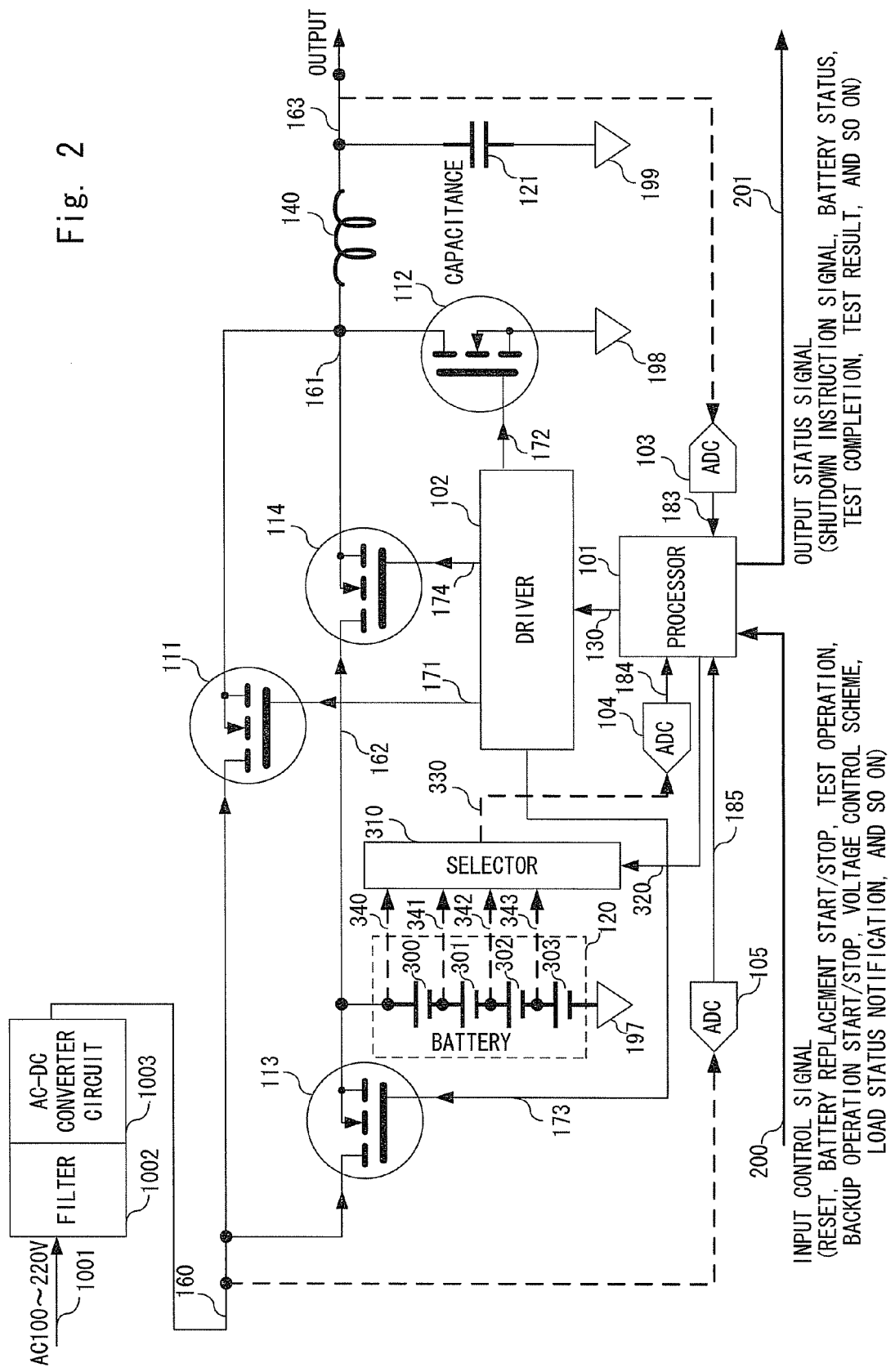
FIG. 2 is a block configuration diagram showing an example of a block configuration in a case where the battery of the uninterruptible power supply apparatus shown in FIG. 1 is composed of a plurality of series-connected battery cells.

Next, a configuration example of an uninterruptible power supply apparatus having a function of measuring a characteristic difference among each battery cell is explained with reference to FIG. 2 by using an example case where the battery 120 of the uninterruptible power supply apparatus shown in FIG. 1 is composed of a plurality of series-connected battery cells. FIG. 2 is a block diagram showing an example of a block configuration in a case where the battery 120 of the uninterruptible power supply apparatus shown in FIG. 1 is composed of a plurality of series-connected battery cells. Note that as described above, the battery 120 is formed by a battery pack in which a plurality of battery cells each composed of a secondary battery (battery) capable of being recharged. Further, the processor 101 has a function of measuring a characteristic difference among each battery cell.

An uninterruptible power supply apparatus shown in FIG. 2 is completely similar to the uninterruptible power supply apparatus shown in FIG. 1 except that the battery 120 is composed of a plurality of series-connected battery cells 300, 301, 302 and 303, that a selector 310 that is used to select and read the voltage value of the battery cell 300, 301, 302 or 303 is added, and that the processor 101 has an additional function of measuring a characteristic difference among each of the battery cells 300, 301, 302 and 303. A block configuration of the uninterruptible power supply apparatus shown in FIG. 2 is explained hereinafter.

In the uninterruptible power supply apparatus shown in FIG. 2, similarly to FIG. 1, commercial alternating-current power supply (AC power supply) 1001 having an AC voltage of 100-200V supplied through an AC power-supply line is supplied to an AC-DC converter circuit 1003 through a filter 1002. The AC-DC converter circuit 1003 converts AC power supply output from the filter 1002 and outputs the converted AC power supply as a first DC power-supply voltage 160.

Further, similarly to FIG. 1, a first switch 111 receives a first control signal 171 from a driver 102 as its control signal, receives the first DC power-supply voltage 160 from the AC-DC converter circuit 1003, performs on/off actions with a predetermined pulse width, and thereby outputs a second DC power-supply voltage 161 having a sawtooth wave shape, or becomes an off-state and thereby cuts off the output. Similarly to FIG. 1, a third switch 113 receives a third control signal 173 from the driver 102 as its control signal, receives the first DC power-supply voltage 160 from the AC-DC converter circuit 1003, performs on/off actions with a specified pulse width, and thereby outputs a third DC power-supply voltage 162 having a sawtooth wave shape, or becomes an off-state and thereby cuts off the output.

Further, similarly to FIG. 1, a fourth switch 114 receives a fourth control signal 174 from the driver 102 as its control signal, receives the third DC power-supply voltage 162 from the third switch 113, i.e., a battery voltage output from a battery 120 composed of a battery pack, performs on/off actions with a specified pulse width, and thereby outputs the resultant power-supply voltage as the second DC power-supply voltage 161, together with the first DC power-supply voltage 160 output from the AC-DC converter circuit 1003, to the output side of the first switch 111, or becomes an off-state and thereby cuts off the output. Similarly to FIG. 1, a second switch 112 receives a second control signal 172 from the driver 102 as its control signal, receives the second DC power-supply voltage 161 from the first and fourth switches 111 and 114, and outputs a second ground potential 198. That is, the second switch 112 becomes an off-state according to the second control signal 172 and thereby allows the first and fourth switches 111 and 114 to output the second DC power-supply voltage 161, or becomes an on-state, drops the second DC power-supply voltage 161 to the ground potential of the second ground potential 198, and thereby stops the output.

Meanwhile, in contrast to FIG. 1, the battery 120 includes a plurality of series-connected battery cells 300, . . . , and 303 as the rechargeable second battery (battery), in which the positive terminal of the front battery cell 300 is connected to a power-supply line through which the third DC power-supply voltage 162 is output from the third switch 113, and the negative terminal of the rearmost battery cell 303 is connected to a first ground potential 197.

Further, power-supply lines for measuring the battery voltages 340, . . . , and 343 of the respective battery cells 300, . . . , and 303 are connected to respective inputs of the selector 310. The selector 310 is a select switch that selects one of the power-supply lines for measuring the battery voltages 340, . . . , and 343 according to a select control signal 320 output from the processor 101, and outputs the battery voltage from the selected battery cell as an output battery voltage 330. That is, the selector 310 supplies the DC power-supply voltage on the power-supply line connected to the positive terminal of the selected battery cell among the battery cells 300, . . . , and 303 as the output battery voltage 330 to the second analog-digital converter circuit 104.

A processor 101 receives an external input control signal 200 as its control signal, receives a first digital signal 183, a second digital signal 184, and a third digital signal 185 from a first analog-digital converter circuit 103, a second analog-digital converter circuit 104, and a third analog-digital converter circuit 105 respectively, and outputs a control signal 130 for the driver 102 and an external output status signal 201. Note that the processor 101 has a function of analyzing a characteristic difference among each of the battery cells 300, . . . , and 303 based on the second digital signal 184 supplied from the second analog-digital converter circuit 104.

Note that similarly to FIG. 1, the input control signal 200 input to the processor 101 is composed of various information items for controlling the uninterruptible power supply apparatus such as a reset, a start/stop of replacement of the secondary battery (battery), i.e., the battery 120, a test operation, a start/stop of a backup operation, a voltage control scheme, and a load status notification. Meanwhile, similarly to FIG. 1, the output status signal 201 output from the processor 101 is composed of various status information items for indicating the status and/or the instruction information of the uninterruptible power supply apparatus such as a shutdown instruction signal, a status of the secondary battery (battery), i.e., the battery 120, test completion, and a test result.

Similarly to FIG. 1, the driver 102 receives the control signal 130 from the processor 101, and outputs the first control signal 171, the second control signal 172, the third control signal 173, and the fourth control signal 174 to the first switch 111, the second switch 112, the third switch 113, and the fourth switch 114 respectively.

Similarly to FIG. 1, the first analog-digital converter circuit 103 reads the voltage value of a last-stage output DC power-supply voltage 163 to be output to the load side, converts the read voltage value into a digital value, and outputs the converted digital value as the first digital signal 183 to the processor 101. In contrast to FIG. 1, the second analog-digital converter circuit 104 reads the voltage value of the output battery voltage 330 output from the selector 310, i.e., the voltage value at the positive terminal of each of battery cells 300, . . . , and 303 (i.e., the voltage values of the battery voltages 340, . . . , and 343), converts the read voltage value into a digital value, and outputs the converted digital value as the second digital signal 184 to the processor 101. Similarly to FIG. 1, the third analog-digital converter circuit 105 reads the voltage value of the first DC power-supply voltage 160 output from the AC-DC converter circuit 1003, converts the read voltage value into a digital value, and outputs the converted digital value as the third digital signal 185 to the processor 101.

Similarly to FIG. 1, an inductance 140 is connected between a power-supply line through which the second DC power-supply voltage 161 is output from the first and fourth switches 111 and 114 and an output power-supply line through which the last-stage output DC power-supply voltage 163 is output. Similarly to FIG. 1, the positive terminal of a capacitor 121 is connected to the output power-supply line through which the last-stage output DC power-supply voltage 163 is output, and the negative terminal is connected to a third ground potential 199. That is, the inductance 140 and the capacitor 121 forms a smoothing circuit that smoothes the second DC power-supply voltage 161 having a sawtooth wave shape and thereby outputs the smoothed output DC power-supply voltage 163.

Explanation of Operation of Exemplary Embodiment of the Invention

Figure 3:
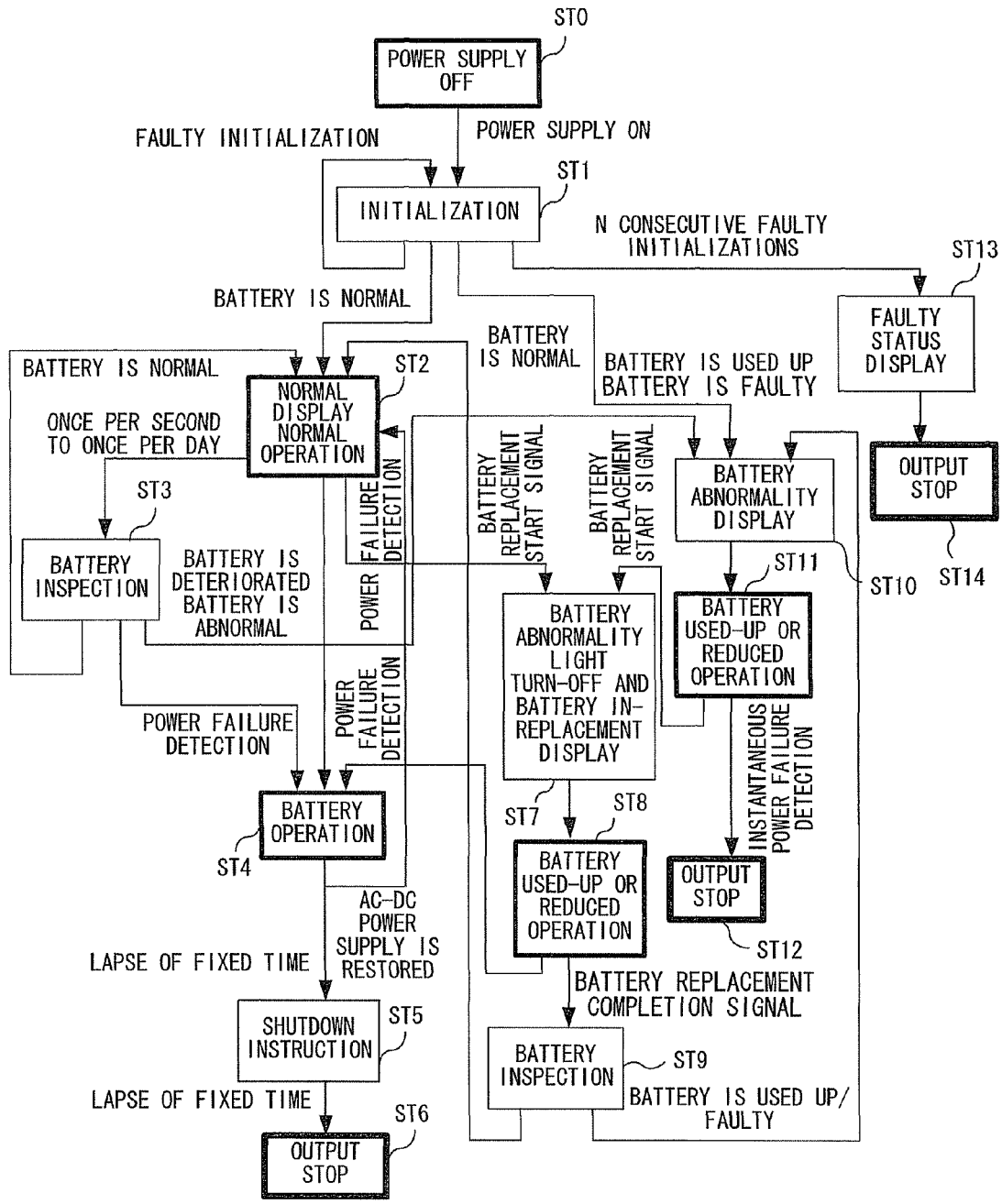
FIG. 3 is a state transition diagram for explaining an example of an operation of the uninterruptible power supply apparatus shown in FIGS. 1 and 2.
Figure 4:
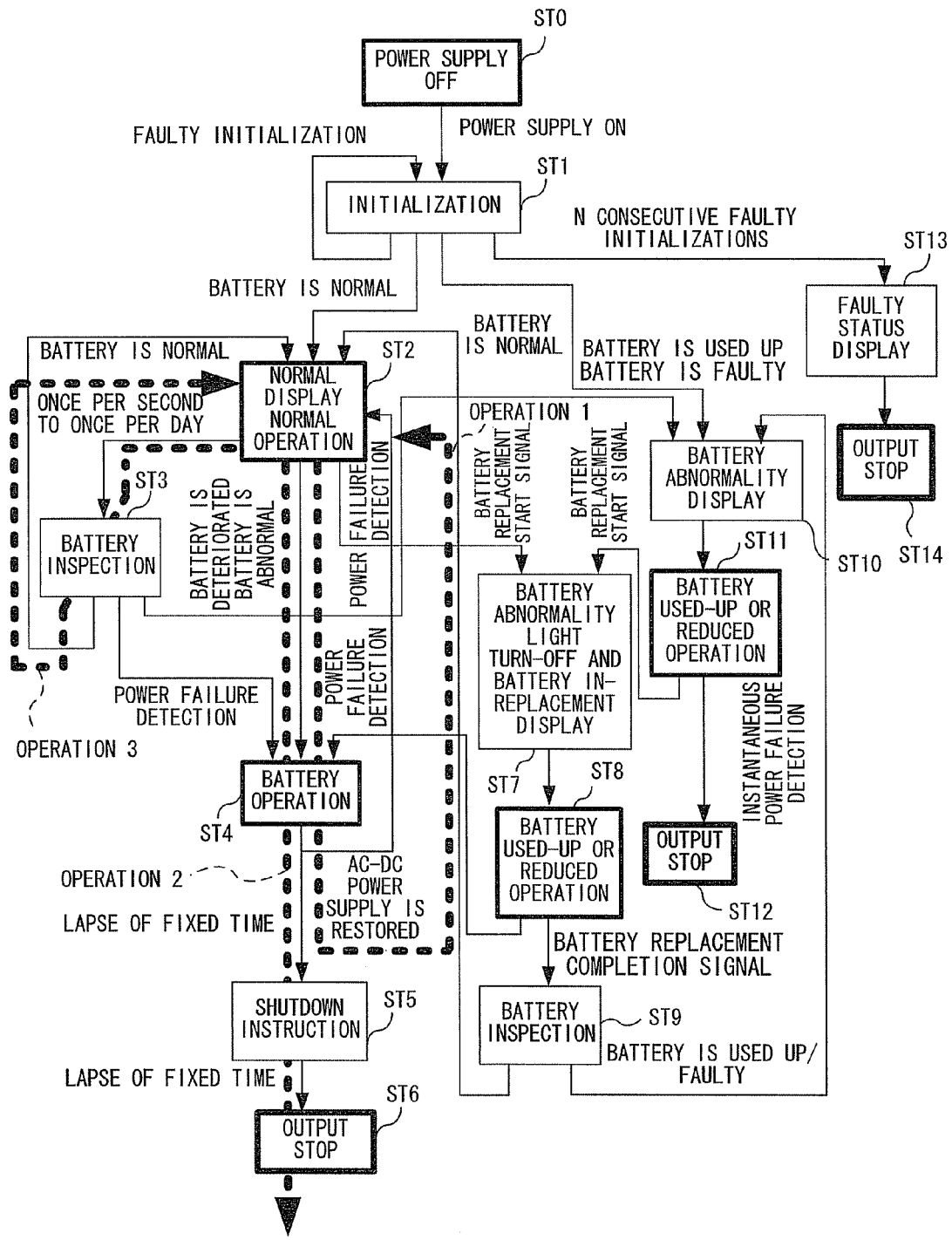
FIG. 4 is an explanatory diagram for showing which of the transition processes shown in the state transition diagram in FIG. 3 the uninterruptible power supply apparatus shown in FIGS. 1 and 2 have gone through for respective one of the timing charts shown in below-described FIGS. 5 to 7 that show aspects of changes of a signal waveform at each part of the uninterruptible power supply apparatus.

Next, as an example of an uninterruptible power supply apparatus according to the present invention, an example of an operation of the uninterruptible power supply apparatus shown in FIGS. 1 and 2 is explained with reference to state transition diagrams shown in FIGS. 3 and 4 and timing charts shown in FIGS. 5 to 7. FIG. 3 is a state transition diagram for explaining an example of an operation of the uninterruptible power supply apparatus shown in FIGS. 1 and 2. FIG. 4 is an explanatory diagram for showing which of the transition processes shown in the state transition diagram in FIG. 3 the uninterruptible power supply apparatus shown in FIGS. 1 and 2 have gone through for respective one of the timing charts shown in below-described FIGS. 5 to 7 that show aspects of changes of a signal waveform at each part of the uninterruptible power supply apparatus, i.e., for respective one of first to third operation sequences.

Figure 5:
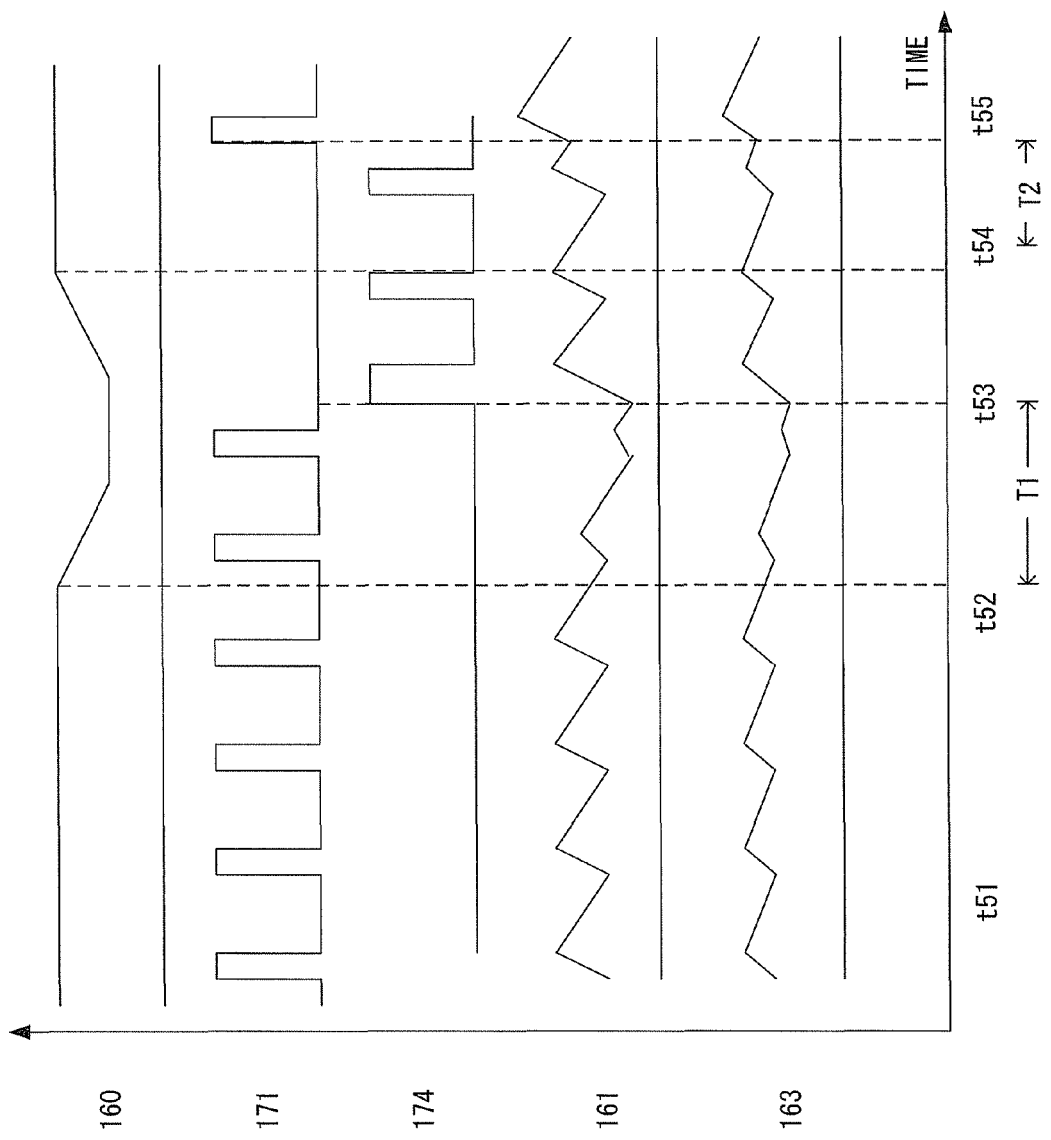
FIG. 5 is a timing chart showing an example of an operation of the uninterruptible power supply apparatus shown in FIGS. 1 and 2 as a first operating sequence.

FIG. 5 is a timing chart showing an example of an operation of the uninterruptible power supply apparatus shown in FIGS. 1 and 2 as the first operating sequence, and shows an operation in a case in which: when a power failure occurs during a normal operation, the feeding operation is switched to the feeding operation from the secondary battery (battery) for backup, i.e., from the battery 120; however, since the duration of the power failure is short, the uninterruptible power supply apparatus returns to the normal operation again. FIG. 6 is a timing chart showing another example, i.e., a different example from that shown in FIG. 5, of an operation of the uninterruptible power supply apparatus shown in FIGS. 1 and 2 as a second operating sequence, and shows an operation in a case in which the degree of the deterioration of the secondary battery (battery), i.e., the battery 120 is measured at a fixed cycle that is determined in advance as a battery inspection cycle.

Figure 6:
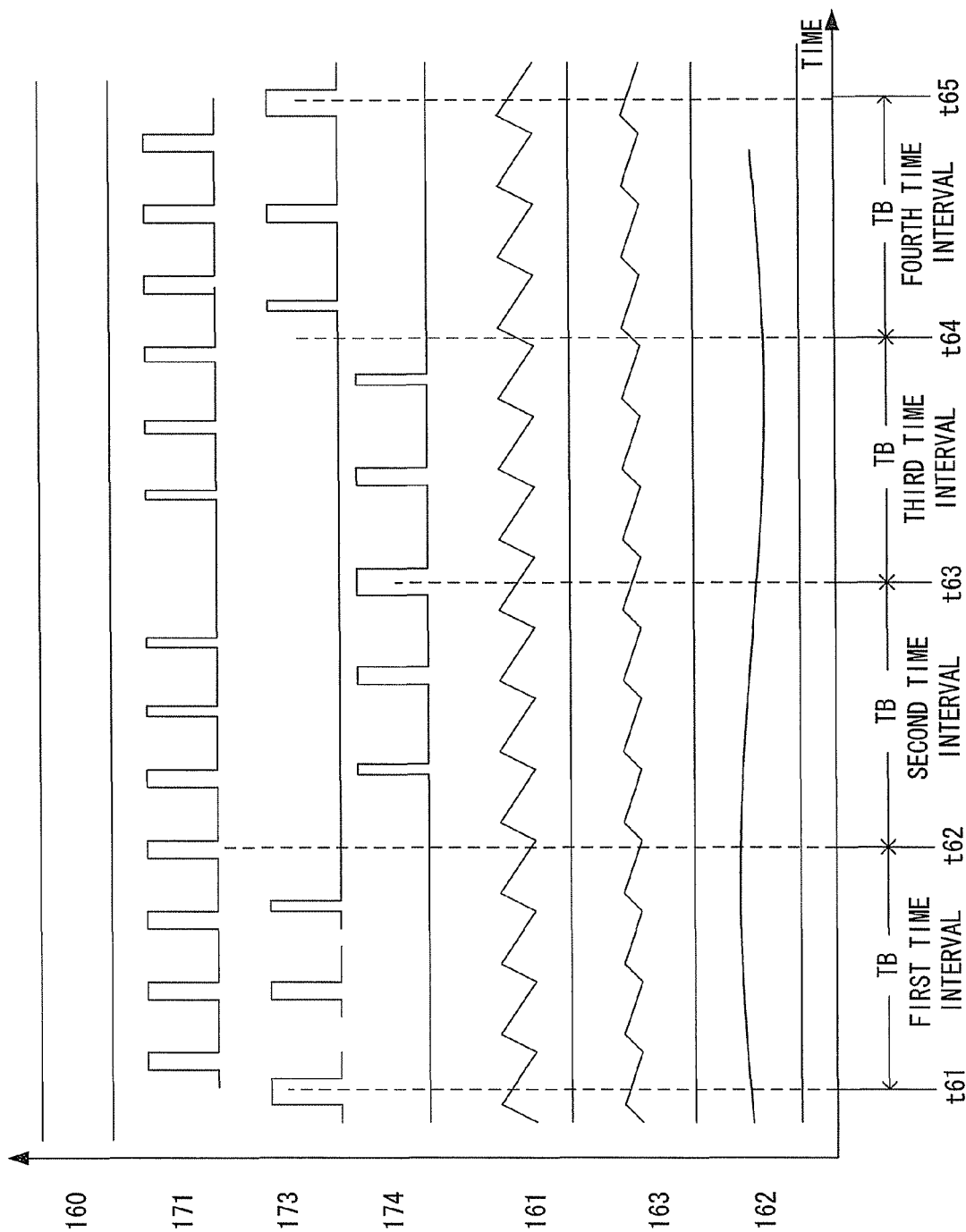
FIG. 6 is a timing chart showing another example, i.e., a different example from that shown in FIG. 5, of an operation of the uninterruptible power supply apparatus shown in FIGS. 1 and 2 as a second operating sequence.
Figure 7:
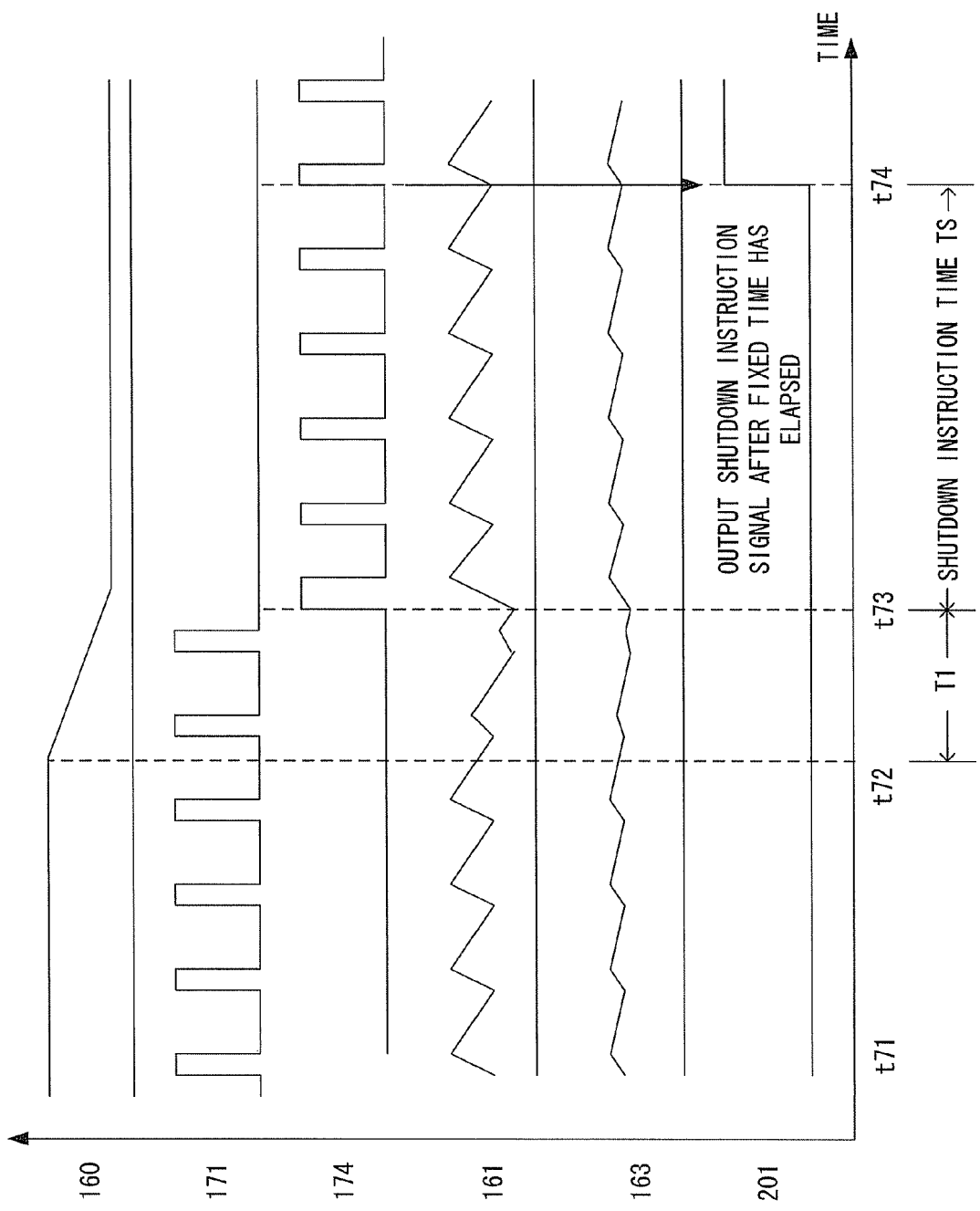
FIG. 7 is a timing chart showing another example, i.e., a different example from those shown in FIGS. 5 and 6, of an operation of the uninterruptible power supply apparatus shown in FIGS. 1 and 2 as a second operating sequence.

FIG. 7 is a timing chart showing another example, i.e., a different example from those shown in FIGS. 5 and 6, of an operation of the uninterruptible power supply apparatus shown in FIGS. 1 and 2 as a third operating sequence, and shows a case in which: a power failure occurs during a normal operation, and the power supply is thereby switched to the discharging operation from the secondary battery (battery) for backup, i.e., the battery 120; however, since the duration of the power failure exceeds a predetermined fixed time that is determined in advance as a shutdown instruction time, a shutdown instruction signal indicating a shutdown is output as an output status signal 201 to an electronic device(s) that is connected to the uninterruptible power supply apparatus as a load(s).

Firstly, the state transition diagram shown in FIG. 3 is explained. In the state transition diagram shown in FIG. 3, when an uninterruptible power supply apparatus is powered on from a power-off state (status ST0), the uninterruptible power supply apparatus changes to an initialization state (status ST1) in which the uninterruptible power supply apparatus is initialized. In the initialization state (status ST1), an initialization operation is performed for each part. However, if the initialization is faulty, the initialization state (status ST1) continues and the initialization operation is repeated.

However, when the faulty initialization occurs N times (N is a predetermined number) in a row in the initialization state (status ST1), the uninterruptible power supply apparatus changes to a faulty status display state (status ST13) for displaying the status that the initialization of the uninterruptible power supply apparatus has failed, outputs a status signal indicating the initialization failure as the output status signal 201, and thereby displays that state. Then, the uninterruptible power supply apparatus changes to an output stop state (status ST14) in which the uninterruptible power supply apparatus stops the feeding operation to an electric device(s) on the load side in a forced manner by turning on the second switch and thereby establishing a state in which the second DC power-supply voltage 161 is dropped to the ground potential.

Further, in the initialization state (status ST1), when the initialization is successfully performed and the output of the secondary battery (battery) of the battery 120 is normal, the uninterruptible power supply apparatus changes to a normal display normal operation state (status ST2) for displaying the normal state and performing a normal operation, outputs a status signal indicating that the initialization has been successfully completed as the output status signal 201, and thereby displays that state. Further, the uninterruptible power supply apparatus starts the feeding operation to the electric device(s) on the load side.

Note that in the normal display normal operation state (status ST2), the uninterruptible power supply apparatus has already changed to a battery inspection state (status ST3) in which the uninterruptible power supply apparatus periodically inspects the deterioration state of the secondary battery (battery) of the battery 120 at a predetermined battery inspection cycle, for example, at an arbitrary cycle from once a second to once a day, in order to periodically inspect the state of the battery 120 of the secondary battery (battery). In the battery inspection state (status ST3), the uninterruptible power supply apparatus inspects the deterioration state of the secondary battery (battery) of the battery 120 while continuing the feeding operation to the electric device on the load side. Then, if the state of the secondary battery (battery) of the battery 120 is normal, the uninterruptible power supply apparatus returns to the normal display normal operation state (status ST2) and continues the feeding operation to the electric device on the load side. Further, the uninterruptible power supply apparatus repeats these operations.

On the other hand, if it is detected that the secondary battery (battery) of the battery 120 has deteriorated or is in an abnormal condition in the battery inspection state (status ST3), the uninterruptible power supply apparatus changes to a battery abnormality display state (status ST10) for displaying that the secondary battery (battery) of the battery 120 has deteriorated or is in an abnormal condition, outputs a status signal indicating the deterioration or abnormality of the battery of the battery 120 as the output status signal 201, and thereby displays that state. After that, the uninterruptible power supply apparatus changes to a battery used-up or reduced state (status ST11) in which the secondary battery (battery) of the battery 120 is in a used up state or in a degraded operation state in which the feeding level to the electric device on the load side is lowered.

In the battery used-up or reduced state (status ST11), when the replacement operation of the secondary battery (battery) of the battery 120 starts, a battery replacement start signal is input as the input control signal 200. Therefore, the uninterruptible power supply apparatus changes to a battery abnormality light turn-off and battery in-replacement display state (status ST7) for turning off the display light indicating the battery abnormality of the battery 120 and displaying the in-replacement state of the secondary battery (battery) of the battery 120. In the battery abnormality light turn-off and battery in-replacement display state (status ST7), the uninterruptible power supply apparatus outputs a status signal for turning off the display light indicating the abnormality of the secondary battery (battery) of the battery 120 and indicating that the secondary battery (battery) of the battery 120 is being replaced as the output status signal 201, and thereby displays that state. After that, the uninterruptible power supply apparatus changes to the battery used-up or reduced state (status ST8) again.

In the battery used-up or reduced state (status ST8), when the replacement of the secondary battery (battery) of the battery 120 has been finished, a battery replacement completion signal is input as the input control signal 200. Therefore, the uninterruptible power supply apparatus changes to a battery inspection state (status ST9) for inspecting the state of the secondary battery (battery) of the replaced battery 120. In the battery inspection state (status ST9), if the secondary battery (battery) of the replaced battery 120 is in a normal state, the uninterruptible power supply apparatus retunes to the normal display normal operation state (status ST2) for displaying that state and performing a normal operation.

However, if the secondary battery (battery) of the replaced battery 120 is in the same state as the battery used-up state or is faulty in the battery inspection state (status ST9), the uninterruptible power supply apparatus returns to the battery abnormality display state (status ST10) for displaying that the secondary battery (battery) of the replaced battery 120 is still in the abnormal condition and thereby urges the operator to replace the secondary battery (battery) of the battery 120 again.

Further, if it is detected that the logic level of the third digital signal 185 output from the third analog-digital converter circuit 105 is "0" and the first DC power-supply voltage 160 is not being output in the normal display normal operation state (status ST2), in the battery inspection state (status ST3), or in the battery used-up or reduced state (status ST8) in which the battery is being replaced, it is detected as a power failure of the commercial alternating-current power supply (AC power supply) 1001.

When a power failure of the commercial alternating-current power supply (AC power supply) 1001 is detected, the uninterruptible power supply apparatus changes to a battery operation state (status ST4) in which the uninterruptible power supply apparatus makes the fourth switch 114 perform on/off actions with a specified pulse width and thereby starts the feeding operation from the secondary battery (battery) of the battery 120 for backup. In the battery operation state (status ST4), the uninterruptible power supply apparatus becomes a state in which the battery voltage output from the secondary battery (battery) of the battery 120, i.e., the third DC power-supply voltage 162 is used instead of the first DC power-supply voltage 160 output from the AC-DC converter circuit 1003. Therefore, the uninterruptible power supply apparatus changes to an operation state in which the uninterruptible power supply apparatus outputs the battery voltage through the fourth switch 114 performing on/off actions at a specified pulse width as the second DC power-supply voltage 161 having a sawtooth wave shape, smoothes the output battery voltage by the smoothing circuit composed of the inductance 140 and the capacitor 121, and feeds the smoothed battery voltage to the electric device on the load side as the output DC power-supply voltage 163.

Further, in the battery operation state (status ST4), if it is detected that the logic level of the third digital signal 185 output from the third analog-digital converter circuit 105 is not "0" and thereby detected that the uninterruptible power supply apparatus has returned to the state where the first DC power-supply voltage 160 is being output, it is detected as that the power failure of the commercial alternating-current power supply (AC power supply) 1001 has been solved. When the power failure of the commercial alternating-current power supply (AC power supply) 1001 is solved, the uninterruptible power supply apparatus returns to the normal display normal operation state (status ST2) for displaying that the power failure has been solved and performing the normal operation in order to return to the normal state in which the uninterruptible power supply apparatus turns off the fourth switch 114, cuts off the output from the secondary battery (battery) of the battery 120 for backup, stops the feeding operation from the battery 120 to the electric device on the load side, and feeds the first DC power-supply voltage 160 output from the AC-DC converter circuit 1003 to the electric device on the load side.

On the other hand, if the power failure of the commercial alternating-current power supply (AC power supply) 1001 is not solved and thus the first DC power-supply voltage 160 is not output yet even after a fixed time that is determined in advance as a shutdown instruction time has elapsed in the battery operation state (status ST4), the uninterruptible power supply apparatus changes to a shutdown instruction state (status ST5), outputs a shutdown instruction signal to the electric device on the load side as the output status signal 201, and thereby urges the electric device to shut down. If the power failure of the commercial alternating-current power supply (AC power supply) 1001 is not solved even after that and a fixed time that is determined in advance as an output stop time has further elapsed, the uninterruptible power supply apparatus changes to an output stop state (status ST6), turns off the second switch 112, drops the second DC power-supply voltage 161 to the ground potential, and thereby stops the feeding operation to the electric device on the load side in a forced manner.

Note that if a power failure is notified in the battery used-up or reduced state (status ST11), the uninterruptible power supply apparatus immediately changes to an output stop state (status ST12) for stopping the feeding operation from the uninterruptible power supply apparatus to the electric device on the load side in a forced manner even when the power failure is an instantaneous power failure. This is because the secondary battery (battery) of the battery 120 for backup is in the same state as the battery used-up state or is faulty and the replacement operation of the secondary battery (battery) of the battery 120 has not been started yet in the battery used-up or reduced state (status ST11).

Next, Operation 1 indicated by a broken line in the state transition diagram shown in FIG. 4 is explained with reference to the timing chart shown in FIG. 5. As described above, the timing chart shown in FIG. 5 shows an operation in a case in which: since a power failure of the commercial alternating-current power supply (AC power supply) 1001 occurs during a normal operation, the feeding operation is switched to the feeding operation from the secondary battery (battery) for backup, i.e., the battery 120; however, since the duration of the power failure is short, the uninterruptible power supply apparatus returns to the normal operation again in which electricity is fed from the commercial alternating-current power supply (AC power supply) 1001 again. Note that in the timing chart shown in FIG. 5, the battery 120 of the secondary battery (battery) for backup has not deteriorated yet and thus is in a normal state.

In such a case, as shown in the state transition diagram shown in FIG. 4, the uninterruptible power supply apparatus repeats a transition operation between two states, i.e., between the status ST2 and the status ST4 in a looped fashion as follows:

Normal display normal operation state (status ST2);

(Power failure detection) Battery operation state (status ST4);

(Power failure cancellation) Normal display normal operation state (status ST2);

(Power failure notification) Battery operation state (status ST4);

. . . .

As shown in the timing chart shown in FIG. 5, in a time t51 to t52, the first DC power-supply voltage 160 output from the AC-DC converter circuit 1003 is maintained at a stable voltage value. Further, the processor 101, which receives the third digital signal 185 that is obtained by the third analog-digital converter circuit 105 by converting the voltage value of the first DC power-supply voltage 160, recognizes that the first DC power-supply voltage 160 is in a normal and stable state. Therefore, the processor 101 outputs a control signal 130 for instructing the first switch 111 to perform on/off actions with a predetermined pulse width to the driver 102.

As a result, as shown in FIG. 5, upon receiving the control signal 130, the driver 102 outputs a first control signal 171 that is turned on/off with a predetermined pulse width to the first switch 111. Therefore, the second DC power-supply voltage 161 output from the first switch 111 is output as a voltage waveform having a fixed-cycle sawtooth wave shape.

The second DC power-supply voltage 161 having a sawtooth wave shape is smoothed by the smoothing circuit composed of the inductance 140 and the capacitor 121, and the output DC power-supply voltage 163 having the smoothed voltage waveform is fed to the electric device on the load side.

Further, the processor 101 inspects the deterioration state of the battery 120 of the secondary battery (battery) at a predetermined battery inspection cycle (once a second to once a day) in order to periodically inspect the state of the battery 120 of the secondary battery (battery).

That is, in the time t51 to t52 in FIG. 5, the uninterruptible power supply apparatus shown in FIGS. 1 and 2 repeats the operation for changing from the normal display normal operation state (status ST2) shown in FIG. 4 to the battery inspection state (status ST3) every time the elapsed time reaches the battery inspection cycle.

In the uninterruptible power supply apparatus shown in FIGS. 1 and 2 in such a state, when the voltage value of the first DC power-supply voltage 160 output from the AC-DC converter circuit 1003 starts to decrease at the time t52 in FIG. 5 at which the uninterruptible power supply apparatus is in the normal display normal operation state (status ST2), the processor 101, which receives the third digital signal 185 that is obtained by the third analog-digital converter circuit 105 by converting the voltage value of that first DC power-supply voltage 160, recognizes that the voltage value of the first DC power-supply voltage 160 has started to decrease. Therefore, the processor 101 presumes that the commercial alternating-current power supply (AC power supply) will have a power failure after a fixed time that is determined in advance as a secondary battery feed start time T1 has elapsed, and thus determines that the power supply that feeds electricity to the electric device on the load side should be changed from the commercial alternating-current power supply (AC power supply) to the battery 120 of the secondary battery (battery).

When the secondary battery feed start time T1 has elapsed from the time t52 in FIG. 5 and thus the elapsed time reaches a time t53, the processor 101 assumes that the power failure of the commercial alternating-current power supply (AC power supply) is notified. Therefore, the processor 101 changes to the battery operation state (status ST4), outputs a control signal 130 for stopping the on/off action of the first switch 111 and thereby turning off the first switch 111 to the driver 102, and outputs a control signal 130 for turning on/off the fourth switch 114 with a specified pulse width.

As a result, as shown in FIG. 5, upon receiving the control signal 130, the driver 102 outputs a first control signal 171 having a logic level "0" to the first switch 111. Therefore, the first switch 111 is set to an off-state and the output from the first switch 111, which performs switching for the first DC power-supply voltage 160 output from the AC-DC converter circuit 1003, is thereby cut off. Meanwhile, a fourth control signal 174 that is turned on/off with a specified pulse width is output to the fourth switch 114, and the fourth switch 114, which performs switching for the battery voltage output from the battery 120 of the secondary battery (battery), is thereby tuned on/off with the specified pulse width. Therefore, the uninterruptible power supply apparatus changes to a state in which the second DC power-supply voltage 161 output from the fourth switch 114, instead of from the first switch 111, is output as a voltage waveform having a fixed-cycle sawtooth wave shape.

The second DC power-supply voltage 161 having a sawtooth wave shape output from the battery 120 of the secondary battery (battery) is smoothed by the smoothing circuit composed of the inductance 140 and the capacitor 121, and the output DC power-supply voltage 163 having the smoothed voltage waveform is fed to the electric device on the load side.

That is, at the time t53 in FIG. 5 which is the secondary battery feed start time T1 after the start of the decrease of the voltage value of the first DC power-supply voltage 160 output from the AC-DC converter circuit 1003, the uninterruptible power supply apparatus shown in FIGS. 1 and 2 changes from the normal display normal operation state (status ST2) shown in FIG. 4 to the battery operation state (status ST4) and becomes a state in which electricity is fed from the secondary battery (battery) of the battery 120, instead of from the commercial alternating-current power supply (AC power supply) 1001, to the load.

However, when the duration of the stopped state of the commercial alternating-current power supply (AC power supply) is short and thus the stopped state of the commercial alternating-current power supply (AC power supply) is solved before the remaining capacity of the battery 120 of the secondary battery (battery), which has started the feeding operation, is not significantly reduced, for example, when the stopped state of the commercial alternating-current power supply (AC power supply) is solved and the power supply is thereby resumed at a time t54 in FIG. 5, the processor 101, which receives the third digital signal 185 that is obtained by the third analog-digital converter circuit 105 by converting the voltage value of that first DC power-supply voltage 160, recognizes that the voltage value of the first DC power-supply voltage 160 has recovered to the normal voltage value.

Therefore, the processor 101 presumes that the commercial alternating-current power supply (AC power supply) will completely recover to the normal power supply state after a fixed time that is determined in advance as an AC power supply feed recovery time T2 has elapsed, and thus determines that the power supply that feeds electricity to the electric device on the load side should be restored from the battery 120 of the secondary battery (battery) to the commercial alternating-current power supply (AC power supply).

That is, when the AC power supply feed recovery time T2 has elapsed from the time T54 in FIG. 5 and thus the elapsed time reaches a time t55, the processor 101 assumes that the commercial alternating-current power supply (AC power supply) has completely recovered to the normal power supply state. Therefore, the processor 101 returns to the normal display normal operation state (status ST2), outputs a control signal 130 for stopping the on/off action of the fourth switch 114 and thereby turning off the fourth switch 114 to the driver 102, and outputs a control signal 130 for turning on/off the first switch 111 with a predetermined pulse width.

As a result, as shown in FIG. 5, upon receiving the control signal 130, the driver 102 outputs a fourth control signal 174 having a logic level "0". Therefore, the fourth switch 114 is set to an off-state and the output from the fourth switch 114, which performs switching for the battery voltage output from the battery 120 of the secondary battery (battery), is thereby cut off. Meanwhile, a first control signal 171 that is turned on/off with a predetermined pulse width is output to the first switch 111, and the first switch 111, which performs switching for the first DC power-supply voltage 160 output from the AC-DC converter circuit 1003, is thereby tuned on/off with a predetermined pulse width. Therefore, the uninterruptible power supply apparatus returns to the state in which the second DC power-supply voltage 161 output from the first switch 111 is output as a voltage waveform having a fixed-cycle sawtooth wave shape.

The second DC power-supply voltage 161 having a sawtooth wave shape output from the AC-DC converter circuit 1003 is smoothed by the smoothing circuit composed of the inductance 140 and the capacitor 121, and the output DC power-supply voltage 163 having the smoothed voltage waveform is fed to the electric device on the load side.

That is, at the time t55 in FIG. 5 which is the AC power supply feed recovery time T2 after the recovery of the voltage value of the first DC power-supply voltage 160 output from the AC-DC converter circuit 1003, the uninterruptible power supply apparatus shown in FIGS. 1 and 2 returns from the battery operation state (status ST4) shown in FIG. 4 to the normal display normal operation state (status ST2). Therefore, the uninterruptible power supply apparatus stops the feeding operation from the secondary battery (battery) of the battery 120 for backup to the load and returns to the feeding operation from the commercial alternating-current power supply (AC power supply) 1001.

As described above, even when a power failure occurs in the commercial alternating-current power supply (AC power supply) and the feeding operation is switched to the feeding operation from the battery 120 of the secondary battery (battery), the uninterruptible power supply apparatus repeats the normal display normal operation state (status ST2) and the battery operation state (status ST4) when the duration of the power failure of the commercial alternating-current power supply (AC power supply) is much shorter than the discharge termination time with which the remaining capacity of the battery 120 reaches the discharge termination capacity, i.e., the decrease of the remaining capacity is small, and the duration of the power failure is shorter than the shutdown instruction time for urging the electric device on the load side to shut down.

Note that in the timing chart shown in FIG. 5, a case where the battery 120 of the secondary battery (battery) for backup is in a normal state is shown. Whether the battery 120 of the secondary battery (battery) for backup is in a normal state or not is periodically checked in the battery inspection state (status ST3) to which the uninterruptible power supply apparatus changes at the aforementioned battery inspection cycle.

Next, Operation 3 indicated by a broken line in the state transition diagram shown in FIG. 4 is explained with reference to the timing chart shown in FIG. 6. The timing chart shown in FIG. 6 shows, by using the uninterruptible power supply apparatus shown in FIG. 1 as an example, waveforms of DC power-supply voltages and control signals at relevant parts for an operation in which the processor 101 monitors the deterioration state of the battery 120 of the secondary battery (battery) and measures the degree of the deterioration at the battery inspection cycle (once a second to once a day) that is determined in advance in order to periodically inspect the state of the battery 120 of the secondary battery (battery).

Note that as a method for measuring the degree of the deterioration of the battery 120 of the secondary battery (battery), the example shown in FIG. 6 uses a method for measuring whether or not the third DC power-supply voltage 162 output from the battery 120 of the secondary battery (battery), i.e., the voltage value of the battery voltage is output as an expected voltage value that changes in a sine-wave shape at a predetermined cycle by gradually increasing/decreasing the pulse width of the third and fourth control signals 173 and 174 for the third and fourth switches 113 and 114 in a predetermined sine-wave shape at a predetermined time interval TB or by stopping the output and thereby setting the output to a logic level "0", and thereby gradually increasing/decreasing the duration during which the third and fourth switches 113 and 114 are set to an on-state in the sine-wave shape or by setting the third and fourth switches 113 and 114 to an off-state and thereby cutting off the output.

Further, in this example, it is assumed that the first DC power-supply voltage 160 output from the AC-DC converter circuit 1003 is maintained at a stable voltage value, and that a determination result indicating that the battery 120 of the secondary battery (battery) for backup is in a normal state is obtained as an inspection result.

In such a case, as shown in the state transition diagram shown in FIG. 4, the uninterruptible power supply apparatus repeats an ordinary normal operation in which the uninterruptible power supply apparatus changes from the status ST2 in which the feeding operation from the commercial alternating-current power supply (AC power supply) is performed to the status ST3 every time the elapsed time reaches the battery inspection cycle (once a second to once a day), and thereby periodically inspects the state of the battery 120 of the secondary battery (battery) for backup while continuing the feeding operation from the commercial alternating-current power supply (AC power supply) 1001 as follows:

Normal display normal operation state (status ST2);

(Battery inspection cycle) Battery inspection state (status ST3);

(Battery normal) Normal display normal operation state (status ST2);

(Battery inspection cycle) Battery inspection state (status ST3);

. . . .

Note that since the first DC power-supply voltage 160 output from the AC-DC converter circuit 1003 is maintained at a stable voltage value, the processor 101, which receives the third digital signal 185 that is obtained by the third analog-digital converter circuit 105 by converting the voltage value of that first DC power-supply voltage 160, recognizes that the first DC power-supply voltage 160 is in a normal and stable state and thereby outputs a control signal 130 for turning on/off the first switch 111 with a predetermined pulse width to the driver 102.

As a result, in the timing chart shown in FIG. 6, as explained above with reference to FIG. 5, the driver 102 outputs a first control signal 171 that is turned on/off with a predetermined pulse width to the first switch 111. Therefore, the second DC power-supply voltage 161 output from the first switch 111 is output as a voltage waveform having a fixed-cycle sawtooth wave shape. Further, the output second DC power-supply voltage 161 is smoothed by the smoothing circuit composed of the inductance 140 and the capacitor 121, and the output DC power-supply voltage 163 having the smoothed voltage waveform is fed to the electric device on the load side.

In the normal display normal operation state (status ST2) in which the above-described operation of the uninterruptible power supply apparatus is performed, when the elapsed time reaches to the battery inspection cycle (i.e., the elapsed time reaches a time t61 in the timing chart shown in FIG. 6), the uninterruptible power supply apparatus changes to the battery inspection state (status ST3) shown in FIG. 4, and thereby starts the inspection of the battery 120 of the secondary battery (battery) and starts the measurement of the deterioration state.

At the time t61, upon starting the inspection of the battery 120 of the secondary battery (battery), the uninterruptible power supply apparatus starts an operation for controlling the duration during which the third and fourth switches 113 and 114 are set to an on-state. After that, the uninterruptible power supply apparatus alternately selects one of the third and fourth switches 113 and 114 that performs on/off actions at a predetermined time interval TB. In particular, the uninterruptible power supply apparatus alternately turns off one of the switches and operates the other switch performing on/off actions in such a manner that the on-time is gradually increased or decreased in a sine-wave shape at a specified cycle as shown below.

That is, starting from the time t61, every time the time interval TB has elapsed, the elapsed time interval TB is successively defined as "first time interval TB1, "second time interval TB2, "third time interval TB3, "fourth time interval TB4, . . . . Then, the on/off action of the third and fourth switches 113 and 114 is changed in each of these four divided time intervals in the following manner.

(1) First Time Interval TB1=Time t61 to t62

The third switch 113 is made to perform on/off actions at a predetermined cycle and the pulse width (time width during which the logic level becomes "1") of the third control signal 173 to be output to the third switch 113 is gradually decreased in a sine-wave shape having a specified cycle by a specified width at a time so that the on-time is gradually decreased in the sine-wave shape. Meanwhile, the fourth control signal 174 to be output to the fourth switch 114 is not output and kept at the logic level "0" so that the fourth switch 114 becomes an off-state. As a result, as shown in FIG. 6, the third DC power-supply voltage 162 output from the battery 120 of the secondary battery (battery), i.e., the voltage value of the battery voltage gradually increases in the waveform shape of the first ¼ cycle of the sine waveform having the specified cycle and thereby reaches the highest value.

(2) Second Time Interval TB2=Time t62 to t63

The fourth switch 114 is made to perform on/off actions at a predetermined cycle and the pulse width (time width during which the logic level becomes "1") of the fourth control signal 174 to be output to the fourth switch 114 is gradually increased in a sine-wave shape having a specified cycle by a specified width at a time so that the on-time is gradually increased in the sine-wave shape. Meanwhile, the output of the third control signal 173 to be output to the third switch 113 is stopped and is kept at the logic level "0" so that the third switch 113 becomes an off-state. As a result, as shown in FIG. 6, the third DC power-supply voltage 162 output from the battery 120 of the secondary battery (battery), i.e., the voltage value of the battery voltage gradually decreases from the highest value in the waveform shape of the second ¼ cycle of the sine waveform having the specified cycle.

(3) Third Time Interval TB3=Time t63 to t64

The fourth switch 114 is made to perform on/off actions at a predetermined cycle and, unlike the second time interval TB2, the pulse width (time width during which the logic level becomes "1") of the fourth control signal 174 to be output to the fourth switch 114 is gradually decreased in a sine-wave shape having a specified cycle by a specified width at a time so that the on-time is gradually decreased in the sine-wave shape. Meanwhile, the output of the third control signal 173 to be output to the third switch 113 is stopped and is kept at the logic level "0" so that the third switch 113 continues the off-state. As a result, as shown in FIG. 6, the third DC power-supply voltage 162 output from the battery 120 of the secondary battery (battery), i.e., the voltage value of the battery voltage gradually decreases further in the waveform shape of the third ¼ cycle of the sine waveform having the specified cycle and thereby reaches the lowest value.

(4) Fourth Time Interval TB3=Time t64 to t65

The third switch 113 is made to perform on/off actions at a predetermined cycle and the pulse width (time width during which the logic level becomes "1") of the third control signal 173 to be output to the third switch 113 is gradually increased in a sine-wave shape having a specified cycle by a specified width at a time so that the on-time is gradually increased in the sine-wave shape. Meanwhile, the output of the fourth control signal 174 to be output to the fourth switch 114 is stopped and is kept at the logic level "0" so that the fourth switch 114 becomes an off-state. As a result, as shown in FIG. 6, the third DC power-supply voltage 162 output from the battery 120 of the secondary battery (battery), i.e., the voltage value of the battery voltage gradually increases from the lowest value in the waveform shape of the fourth ¼ cycle of the sine waveform having the specified cycle and thereby returns to the same voltage value as the voltage value at the start of the first time interval TB1.

As explained above, in the battery inspection state (status ST3) of the uninterruptible power supply apparatus shown in FIG. 1, when the battery 120 of the secondary battery (battery) is in a normal state, it is possible to change the voltage waveform of the third DC power-supply voltage 162 output from the battery 120 of the secondary battery (battery), i.e., the voltage waveform of the battery voltage in a sine-wave shape at a predetermined cycle (i.e., at a cycle four times longer than the time interval TB) by alternately selecting one of the third and fourth switches 113 and 114 that performs the on/off action at the predetermined time interval TB and gradually increasing or decreasing the on-time of the switch performing the on/off action in a sine-wave shape.

That is, every time the elapsed time reaches the battery inspection cycle, the processor 101 controls the increase/decrease of the pulse width and/or the stop of the signal output of the third and fourth control signals 173 and 174 for the third and fourth switches 113 and 114 at the predetermined time interval TB by using the control signal 130 supplied to the driver 102. Then, as its control result, the processor 101 performs such an operation that the processor 101 reads the voltage value of the third DC power-supply voltage 162 output from the battery 120 i.e., the voltage value of the battery voltage so that the internal resistance of the battery 120, i.e., the deterioration state of the battery 120 given by the expression "battery voltage to be output/current amount" can be measured by changing the amount of the current flowing into the battery 120 and the amount of the current flowing out from the battery 120 in proportion to the pulse width and in a sine-wave shape in the discharging operation of the battery 120.

Therefore, as the operation for reading the voltage value of the third DC power-supply voltage 162 output from the battery 120, i.e., the voltage value of the battery voltage, the processor 101, which receives the second digital signal 184 that is obtained by the second analog-digital converter circuit 104 by converting the third DC power-supply voltage 162, i.e., the voltage value of the battery voltage, can determine whether or not a predetermined voltage value that changes in a sine-wave shape at a predetermined cycle (cycle expressed as "time interval TB×4") is obtained and thereby determines whether or not the battery 120 of the secondary battery (battery) is in a normal state.

Note that in the second time interval (time t62 to t63) and the third time interval (time t63 to t64) in which the fourth switch 114 is turned on/off, for the second DC power-supply voltage 161 on the power-supply line through which the output lines of the first and fourth switches 111 and 114 are connected to each other, there are a case where the first DC power-supply voltage 160 output from the AC-DC converter circuit 1003 is output through the first switch 111 performing on/off actions and a case where the third DC power-supply voltage 162 output from the battery 120 in the battery inspection is output through the fourth switch 114 performing on/off actions in a mixed manner.

Therefore, in the battery inspection state (status ST3), electric power that is consumed for inspecting the battery 120 of the secondary battery (battery) can be also effectively used as electric power to be supplied to the electric device on the load side. However, in order to prevent any trouble from occurring in both of the power-supply route from the first switch 111 and the power-supply route from the fourth switch 114, as shown in FIG. 6, the phase of the fourth control signal 174 is controlled so that the time period in which the logic level of the first control signal 171 for setting the first switch 111 to an on-state is "1" does not overlap the time period in which the logic level of the fourth control signal 174 for setting the fourth switch 114 to an on-state is "1".

Further, in the second time interval (time t62 to t63) and the third time interval (time t63 to t64) in which the fourth switch 114 is turned on/off, as described above, while the second DC power-supply voltage 161 on the power-supply line extending from the AC-DC converter circuit 1003 through the first switch 111 is being smoothed and supplied to the load, the third DC power-supply voltage 162 output from the battery 120 under the battery inspection is also smoothed and supplied to the load through the fourth switch 114.

Therefore, in consideration of the influence of the third DC power-supply voltage 162 output from the battery 120 under the battery inspection, the voltage value of the second DC power-supply voltage 161 output through the first switch 111 is controlled by thinning out some of the pulses of the first control signal 171 for the first switch 111 or narrowing the pulse width of the first control signal 171 so that the voltage value of the last-stage output DC power-supply voltage 163 is kept within the range between the upper limit and the lower limit of the expected voltage value as in the case of the normal operation state.

As described above, in the battery inspection state (status ST3) in which the uninterruptible power supply apparatus is operating, electric power that is consumed for measuring the deterioration of the battery 120 can be also used as electric power for feeding electricity to the load. Therefore, it is possible to recycle the electric power for the uninterruptible power supply apparatus and thereby effectively use the electric power. Further, there is no need to prepare any dedicated circuit for measuring the deterioration of the battery 120 in operation. That is, it is possible to measure the deterioration of the battery 120 just by adding the minimum circuit such as the third and fourth switches 113 and 114 and the second analog-digital converter circuit 104 to an existing switching power supply apparatus, and thereby to minimize the increase in the cost.

Note that FIG. 6 shows an example in which it is determined whether the battery 120 of the secondary battery (battery) is in a normal state or not based on a measurement result of one cycle (cycle expressed as "time interval TB×4") in which the third DC power-supply voltage 162 on the output power-supply line extending from the battery 120 changes in a sine-wave shape. However, the present invention is not limited to this example. That is, the determination may be made based on a measurement result over a plurality of cycles.

Further, in FIG. 6, a case of the uninterruptible power supply apparatus shown in FIG. 1 in which the battery 120 is composed of a signal secondary battery (battery) is explained as an example. However, the above explanation can be also applied to the case of the uninterruptible power supply apparatus shown in FIG. 2 in which the battery 120 is composed of a plurality of series-connected secondary battery (battery) cells, i.e., the battery cells 300, . . . , and 303 in a substantially similar manner.

That is, in the case of the uninterruptible power supply apparatus shown in FIG. 2, it is possible to determine whether each of the battery cells 300, . . . , and 303 is in a normal state or not by making such a setting that one of the battery voltages 340, . . . , and 343 on the positive terminal side of the battery cells 300, . . . , and 303 is led into the second analog-digital converter circuit 104, and thereby successively switching the operation in which the second digital signal 184 obtained by the conversion performed by the second analog-digital converter circuit 104 is read into the processor 101 while controlling the increase/decrease of the pulse width and/or the stop of the signal output of the third and fourth control signals 173 and 174 for the third and fourth switches 113 and 114 at the predetermined time interval TB by using the control signal 130 supplied to the driver 102, i.e., by successively selecting one of the battery cells 300, . . . , and 303 that is led into the second analog-digital converter circuit 104 by using the selector 310.

Note that if the battery 120 of the secondary battery (battery) is not in a fully charged state at the end of the inspection of the battery 120 of the secondary battery (battery) in the battery inspection state (status ST3), the processor 101 outputs a control signal 130 for turning on/off the third switch 113 with a predetermined pulse width to the driver 102 and thereby performs the charging operation of the battery 120 by the first DC power-supply voltage 160 output from AC-DC converter circuit 1003. On the other hand, if the battery 120 of the secondary battery (battery) is in a fully charged state, the processor 101 outputs a control signal 130 for turning off the third switch 113 and thereby stops the charging operation of the battery 120.

Next, Operation 2 in the state transition diagram shown in FIG. 4 is explained with reference to the timing chart shown in FIG. 7. The timing chart shown in FIG. 7 shows, by using the uninterruptible power supply apparatus shown in FIG. 1 as an example, waveforms of DC power-supply voltages and control signals at relevant part for an operation in a case in which a power failure occurs and continues for a long time longer than a predetermined time in the normal display normal operation state (status ST2) in which the uninterruptible power supply apparatus is in a normal operation state.

Note that as explained above with reference to the timing chart shown in FIG. 5, when a power failure of the commercial alternating-current power supply (AC power supply) occurs, the uninterruptible power supply apparatus changes from the normal display normal operation state (status ST2) to the battery operation state (status ST4) and thereby changes to the operation in which electricity is fed from the battery 120 of the secondary battery (battery) for backup, instead of from the commercial alternating-current power supply (AC power supply), to the electric device on the load side. However, when the power failure of the commercial alternating-current power supply (AC power supply) continues a long time, there is a risk that the power failure of the commercial alternating-current power supply (AC power supply) continues for a time longer than the discharge termination time with which the remaining capacity of the substituted battery 120 of the secondary battery (battery) reaches the discharge termination capacity even when the battery 120 is originally in the fully charged state.

Therefore, in such a situation, the feeding operation from the battery 120 of the secondary battery (battery) for backup to the electric device on the load side also needs to be stopped when the aforementioned discharge termination time has elapsed. Therefore, a shutdown instruction signal for urging the electric device on the load side to shut down is transmitted before the elapsed time reaches the discharge termination time.

That is, as shown in the state transition diagram shown in FIG. 4, the uninterruptible power supply apparatus changes in the following order:

Normal display normal operation state (status ST2);

(Power failure detection) Battery operation state (status ST4);

(Shutdown instruction time has elapsed) Shutdown instruction state (status ST5); and (Output stop time has elapsed) Output stop state (status ST6). That is, firstly, when a predetermined fixed time that is determined in advance as a shutdown instruction time has elapsed from the start of the feeding operation from the battery 120 of the secondary battery (battery), a shutdown instruction signal is transmitted to the electric device on the load side. Further, after that, when the power failure of commercial alternating-current power supply (AC power supply) 1001 is not solved even after a fixed time that is determined as an output stop time has elapsed, the uninterruptible power supply apparatus presumes that the remaining capacity of the battery 120 of the secondary battery (battery) has gotten extremely close to the point at which the remaining capacity reaches the discharge termination capacity even if the battery 120 is originally in the fully charged state at the start of the feeding operation. Therefore, the uninterruptible power supply apparatus eventually stops the feeding operation to the electric device on the load side in a forced manner.

As shown in the timing chart shown in FIG. 7, similarly to the time t51 to t52 shown in FIG. 5, in a time t71 to t72, the first DC power-supply voltage 160 output from the AC-DC converter circuit 1003 is maintained at a stable voltage value. Further, the processor 101, which receives the third digital signal 185 that is obtained by the third analog-digital converter circuit 105 by converting the voltage value of that first DC power-supply voltage 160, recognizes that the first DC power-supply voltage 160 is in a normal and stable state. Therefore, the processor 101 outputs a control signal 130 for instructing the first switch 111 to perform on/off actions with a predetermined pulse width to the driver 102.

As a result, as shown in FIG. 7, upon receiving the control signal 130, the driver 102 outputs a first control signal 171 that is turned on/off with a predetermined pulse width to the first switch 111. Therefore, the second DC power-supply voltage 161 output from the first switch 111 is output as a voltage waveform having a fixed-cycle sawtooth wave shape.

The second DC power-supply voltage 161 having a sawtooth wave shape is smoothed by the smoothing circuit composed of the inductance 140 and the capacitor 121, and the output DC power-supply voltage 163 having the smoothed voltage waveform is fed to the electric device on the load side.

In the uninterruptible power supply apparatus shown in FIGS. 1 and 2 that is in the normal display normal operation state (status ST2) as described above, when the voltage value of the first DC power-supply voltage 160 output from the AC-DC converter circuit 1003 starts to decrease at the time t72 in FIG. 7, similarly to the operation at the time t52 shown in FIG. 5, the processor 101, which receives the third digital signal 185 that is obtained by the third analog-digital converter circuit 105 by converting the voltage value of that first DC power-supply voltage 160, recognizes that the voltage value of the first DC power-supply voltage 160 has started to decrease. Therefore, the processor 101 presumes that the commercial alternating-current power supply (AC power supply) will have a power failure after a fixed time that is determined in advance as a secondary battery feed start time T1 has elapsed, and thus determines that the power supply that feeds electricity to the electric device on the load side should be changed from the commercial alternating-current power supply (AC power supply) to the battery 120 of the secondary battery (battery).

When the secondary battery feed start time T1 has elapsed from the time t72 in FIG. 7 and thus the elapsed time reaches a time t73, similarly to the time t53 shown in FIG. 5, the processor 101 assumes that the power failure of the commercial alternating-current power supply (AC power supply) is notified. Therefore, the processor 101 changes to the battery operation state (status ST4), outputs a control signal 130 for stopping the on/off action of the first switch 111 and thereby turning off the first switch 111 to the driver 102, and outputs a control signal 130 for turning on/off the fourth switch 114 with a specified pulse width.

As a result, as shown in FIG. 7, similarly to the operation at the time t52 shown in FIG. 5, upon receiving the control signal 130, the driver 102 outputs a first control signal 171 having a logic level "0". Therefore, the first switch 111 is set to an off-state and the output from the first switch 111, which performs switching for the first DC power-supply voltage 160 output from the AC-DC converter circuit 1003, is thereby cut off. Meanwhile, a fourth control signal 174 that is turned on/off with a specified pulse width is output to the fourth switch 114, and the fourth switch 114, which performs switching for the battery voltage output from the battery 120 of the secondary battery (battery), is thereby tuned on/off with the specified pulse width. Therefore, the uninterruptible power supply apparatus changes to a state in which the second DC power-supply voltage 161 output from the fourth switch 114, instead of from the first switch 111, is output as a voltage waveform having a fixed-cycle sawtooth wave shape.

The second DC power-supply voltage 161 having a sawtooth wave shape output from the battery 120 of the secondary battery (battery) is smoothed by the smoothing circuit composed of the inductance 140 and the capacitor 121, and the output DC power-supply voltage 163 having the smoothed voltage waveform is fed to the electric device on the load side.

That is, at the time t73 in FIG. 7 which is the secondary battery feed start time T1 after the start of the decrease of the voltage value of the first DC power-supply voltage 160 output from the AC-DC converter circuit 1003, the uninterruptible power supply apparatus shown in FIGS. 1 and 2 changes from the normal display normal operation state (status ST2) shown in FIG. 4 to the battery operation state (status ST4) and becomes a state in which electricity is fed from the secondary battery (battery) of the battery 120, instead of from the commercial alternating-current power supply (AC power supply) 1001, to the electric device on the load side.

The timing chart shown in FIG. 7 shows a case where a power failure occurs and continues for a long time, and thus is different from the timing chart shown in FIG. 5 in which the period of the stopped state of the commercial alternating-current power supply (AC power supply) is short. Therefore, there is a risk that the power failure of the commercial alternating-current power supply (AC power supply) continues beyond the point at which the remaining capacity of the battery 120 of the secondary battery (battery), which has started the feeding operation, reaches the discharge termination capacity.

Therefore, at a time t74 in FIG. 7 at which the time elapsed from when the uninterruptible power supply apparatus changed from the normal display normal operation state (status ST2) to the battery operation state (status ST4) has not reached the discharge termination time with which the remaining capacity of the battery 120 of the secondary battery (battery) that was originally in the fully charged state is presumed to reach the discharge termination capacity and a fixed time that is determined in advance as a shutdown instruction time TS has elapsed, the uninterruptible power supply apparatus further changes from the battery operation state (status ST4) to the shutdown instruction state (status ST5). Upon changing to the shutdown instruction state (status ST5), as shown in FIG. 7, the processor 101 outputs a shutdown instruction signal having a continuous logic level "1" as the output status signal 201 to the electric device on the load side and thereby urges the electric device on the load side connected to the uninterruptible power supply apparatus to shut down, while continuing the feeding operation from the battery 120 of the secondary battery (battery) to the electric device on the load side.

If the power failure of the commercial alternating-current power supply (AC power supply) 1001 still continues even after that and a fixed time that is determined in advance as an output stop time has elapsed after the uninterruptible power supply apparatus changed to the shutdown instruction state (status ST5), the uninterruptible power supply apparatus presumes that the remaining capacity of the battery 120 of the secondary battery (battery), which is still feeding electricity to the electric device on the load side, has decreased close to the discharge termination capacity at which the battery 120 of the secondary battery (battery) ends the discharging operation even if the battery 120 was in the fully charged state at the start of the feeding operation.

Therefore, when the elapsed time reaches the aforementioned output stop time, the uninterruptible power supply apparatus changes from the shutdown instruction state (status ST5) to the output stop state (status ST6). Further, the processor 101 cuts off the output from the battery 120 of the secondary battery (battery) by outputting a control signal 130 for turning off the fourth switch 114 and the a control signal 130 for turning on the second switch 112 to the driver 102, and drops the second DC power-supply voltage 161 to the ground potential of the second ground potential 198 and thereby stops the feeding operation from the battery 120 of the secondary battery (battery) to the load in a forced manner.

Note that the output stop time having the predetermined fixed time is used as the transition condition for changing from the shutdown instruction state (status ST5) to the output stop state (status ST6) as described above. However, instead of using the output stop time, whether the remaining capacity of the battery 120 of the secondary battery (battery) has reached the discharge termination capacity or not may be determined, and when the remaining capacity has already reached the discharge termination capacity, the uninterruptible power supply apparatus may change to the output stop state (status ST6).

A configuration example of the uninterruptible power supply apparatus shown in FIGS. 1 and 2 has been explained above. However, the present invention is not limited to the above-described configuration, and various modified examples may be applied within the scope of the present invention.

For example, in the uninterruptible power supply apparatus shown in FIG. 2, a case where a battery pack formed by connecting a plurality of battery cells 300, . . . , 303 in series is used as the battery 120 of the secondary battery (battery) is explained. However, the present invention includes following modified examples:

(1) M battery packs each composed of N series-connected battery cells may be connected in parallel, and thus forming a configuration composed of (N×M) battery cells (where each of M and N is a positive integer); and (2) N battery packs each composed of M parallel-connected battery cells may be connected in series, and thus forming a configuration composed of (M×N) battery cells (where each of M and N is a positive integer).

Alternatively, although the processor 101 and the driver 102 are separate components in the uninterruptible power supply apparatus shown in FIGS. 1 and 2, the processor and the driver may be integrated and formed as one module or one IC (Integrated Circuit).

Alternatively, although one processor 101 performs all control processes in the uninterruptible power supply apparatus shown in FIGS. 1 and 2, the control processes may be distributed over a plurality of processors and thus the loads and the functions may be assigned to the plurality of processors. Further, in the case where the processor 101 is composed of a plurality of processor, those processors may operate in parallel or may operate in a master/slave manner.

Further, although typical FETs (Field Effect Transistors) are used as the first, second, third and fourth switches 111, 112, 113 and 114 in the uninterruptible power supply apparatus shown in FIGS. 1 and 2, the present invention is not limited to this configuration. That is, various transistors including a bipolar transistor and an HEMT (High Electron Mobility Transistor) may be used. Alternatively, a MEMS (Micro Electro-Mechanical Systems) switch(es) having a mechanical movable part may be used.

Explanation of Advantageous Effect of the Invention

As explained above in detail, exemplary embodiments according to the present invention can provide the following advantageous effects.

That is, electric power that is consumed to measure the characteristic of a secondary battery, which deteriorates with time, can be reused and supplied to an electronic device(s) on the load side, and thereby making it possible to realize an uninterruptible power supply apparatus and its control method having high conversion efficiency.

Figure 8:
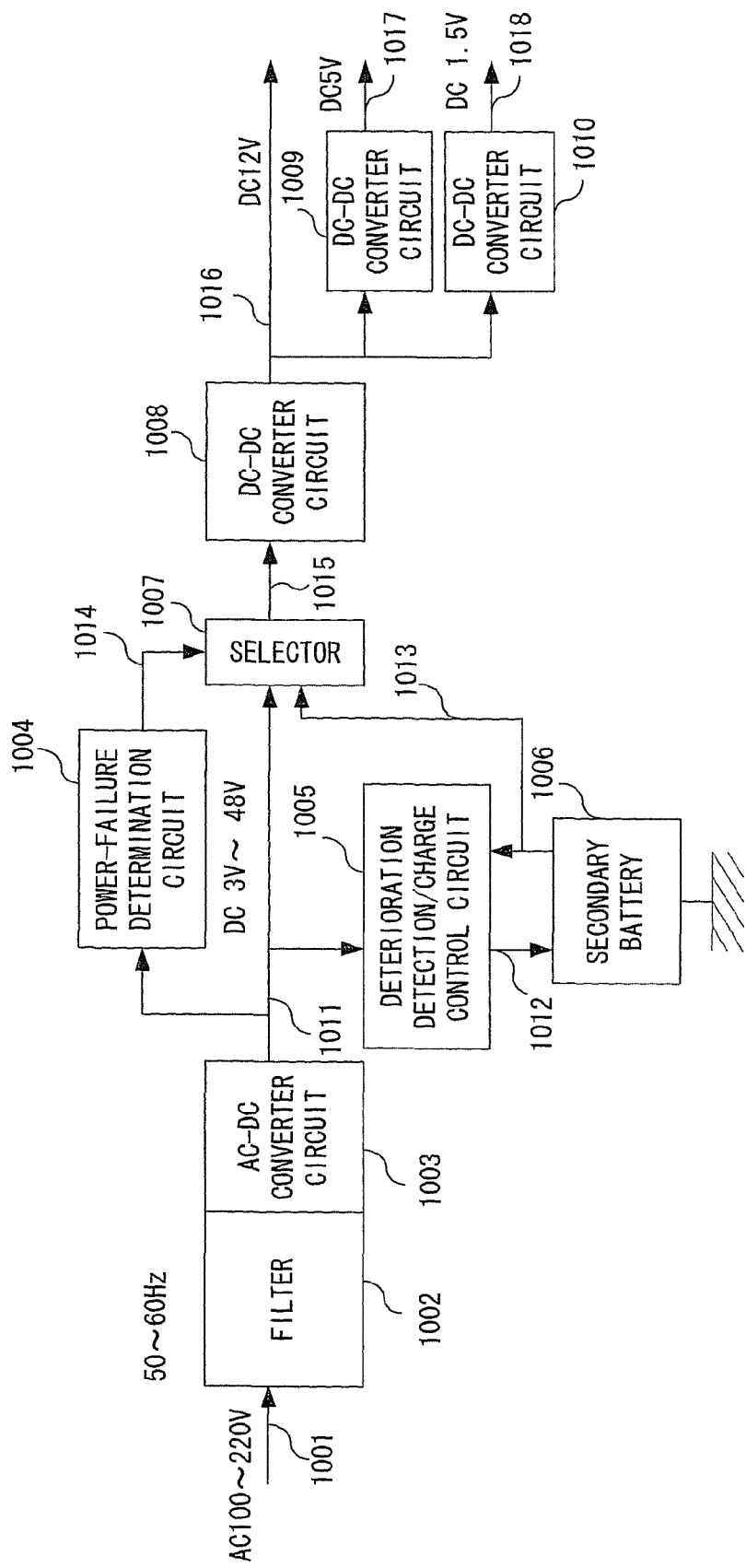

Further, by eliminating the selector 1007 in the typical technique shown in FIG. 8 and by using the same switch as both the switch used for the DC-DC conversion circuit and the switch for the charging control, the number of necessary components can be reduced, and thus making it possible to realize an uninterruptible power supply apparatus and its control method having a high power conversion amount per volume.

Further, since electric power that is consumed for the deterioration measurement of the battery 120 of the secondary battery (battery) can be reused, it is possible to accomplish a first object of the present invention and thereby to realize an uninterruptible power supply apparatus and its control method having high operation efficiency.

Further, it is possible to minimize the number of switches necessary for the charging of the secondary battery, the deterioration measurement and the DC-DC conversion operation, and the circuit size of the analog-digital converter circuit (ADC), and thereby to realize an uninterruptible power supply apparatus and its control method having low cost and excellent volume efficiency.

Further, in the case where the battery 120 of the secondary battery (battery) is formed by using a battery pack composed of a plurality of battery cells such as battery cells 300, . . . , and 303, it is possible to realize an uninterruptible power supply apparatus and its control method capable of continuing the operation even when there is a characteristic difference among each of the battery cells and/or capable of identifying a battery cell having a poor characteristic and urging the replacement thereof.

Configurations of preferable exemplary embodiments according to the present invention have been explained above. However, it should be noted that the above-shown exemplary embodiments are merely examples of the present invention and thus do not limit the present invention. It will be understood by those of ordinary skill in the art that various changes in form and details may be made to the exemplary embodiments without departing from the spirit and scope of the present invention.

The configuration of the present invention can be also described as the following supplementary notes.
(Supplementary Note 1)

An uninterruptible power supply apparatus according to the present invention comprising at least:

an AC-DC converter circuit that receives AC power supply, converts the received AC power supply into a DC power-supply voltage, and outputs the converted DC power-supply voltage as a first DC power-supply voltage;

a first switch that performs an on/off action with a predetermined pulse width for the first DC power-supply voltage output from the AC-DC converter circuit based on a first control signal supplied from a driver and thereby outputs as a second DC power-supply voltage having a sawtooth wave shape, or becomes an off-state and thereby cuts off an output;

a smoothing circuit that smoothes the second DC power-supply voltage and feeds the smoothed DC power-supply voltage as an output DC power-supply voltage to a load side, the smoothing circuit comprising an inductance and a capacitor;

a second switch that becomes an on-state based on a second control signal supplied from the driver, drops the second DC power-supply voltage to a ground potential, and thereby stops outputting the second DC power-supply voltage to the smoothing circuit, or becomes an off-state and thereby outputs the second DC power-supply voltage to the smoothing circuit; a third switch that performs an on/off action with a specified pulse width for the first DC power-supply voltage output from the AC-DC converter circuit based on a third control signal supplied from the driver and thereby outputs as a third DC power-supply voltage having a sawtooth wave shape, or becomes an off-state and thereby cuts off an output;

a fourth switch that performs an on/off action with a specified pulse width for a battery voltage output from a secondary battery based on a fourth control signal supplied from the driver and thereby outputs as the second DC power-supply voltage, instead of or together with the first DC power-supply voltage output from the AC-DC converter circuit, to an output side of the first switch, or becomes an off-state and thereby cuts off an output, the secondary battery being connected between an output side of the third switch and a ground potential;

a first analog-digital converter circuit that converts a voltage value of the output DC power-supply voltage into a first digital signal;

a second analog-digital converter circuit that converts a voltage value of the battery voltage into a second digital signal;

a third analog-digital converter circuit that converts a voltage value of the first DC power-supply voltage into a third digital signal; and a processor that generates a control signal for the driver based on the first to third digital signals output from the first to third analog-digital converter circuits and an externally-supplied input control signal, outputs the generated control signal to the driver, and thereby makes the driver output the first to fourth control signals to the first to fourth switches.
(Supplementary Note 2)

The uninterruptible power supply apparatus described in Supplementary note 1, wherein the secondary battery is formed by connecting M battery packs (M: positive integer) each composed of N series-connected battery cells (N: positive integer) in parallel, or connecting N battery packs each composed of M parallel-connected battery cells in series.
(Supplementary Note 3)

The uninterruptible power supply apparatus described in Supplementary note 2, further comprising a selector that selects one of power-supply lines connected to outputs of respective battery cells according to a select control signal output from the processor, and connects the selected power-supply line to the second analog-digital converter circuit, wherein the processor generates the select control signal and outputs the generated select control signal to the selector.

(Supplementary Note 4)

The uninterruptible power supply apparatus described in any one of Supplementary notes 1 to 3, wherein the first to fourth switches comprise a semiconductor switch.

(Supplementary Note 5)

The uninterruptible power supply apparatus described in any one of Supplementary notes 1 to 4, wherein the processor changes to a secondary battery inspection state at a fixed cycle that is determined in advance as a battery inspection cycle, and thereby periodically performs an operation for inspecting a deterioration state of the secondary battery while continuing a feeding operation to the load side by the first power-supply voltage output from the first switch.

(Supplementary Note 6)

The uninterruptible power supply apparatus described in Supplementary note 5, wherein in the secondary battery inspection state, the processor, at a predetermined time interval, gradually increases/decreases a pulse width of the third or fourth control signal in a predetermined sine-wave shape or stops an output, and thereby gradually increases/decreases an on-time of the third or fourth switch in the sine-wave shape, or controls the third or fourth switch into an off-state, and reads the second digital signal output from the second analog-digital converter circuit, and by doing so, the processor measures whether or not a voltage value of the battery voltage output from each battery cell of the secondary battery or a battery pack constituting the secondary battery is output as a voltage value that changes in a sine-wave shape at a predetermined cycle.

(Supplementary Note 7)

The uninterruptible power supply apparatus described in Supplementary note 6, wherein as the predetermined time interval, the predetermined cycle is divided into four time intervals including first to fourth time intervals, and in the first time interval, a pulse width of the third control signal for the third switch is gradually decreased in a sine-wave shape and an output of the fourth control signal for the fourth switch is set to a logic level "0", in the second time interval, a pulse width of the fourth control signal for the fourth switch is gradually increased in a sine-wave shape and an output of the third control signal for the third switch is set to a logic level "0", in the third time interval, the pulse width of the fourth control signal for the fourth switch is gradually decreased in a sine-wave shape and the output of the third control signal for the third switch is set to a logic level "0", and in the fourth time interval, the pulse width of the third control signal for the third switch is gradually increased in a sine-wave shape and the output of the fourth control signal for the fourth switch is set to a logic level "0".

(Supplementary Note 8)

The uninterruptible power supply apparatus described in Supplementary note 6 or 7, wherein in the secondary battery inspection state, the driver sets a pulse phase of the fourth control signal for the fourth switch based on a control signal supplied from the processor so that an on-time of the first switch does not overlap an on-time of the fourth switch.

(Supplementary Note 9)

The uninterruptible power supply apparatus described in any one of Supplementary notes 6 to 8, wherein in the secondary battery inspection state, the driver thins out some of pulses of the first control single for the first switch or narrows a pulse width of the first control signal, based on a control signal supplied from the processor, so as to correspond to a change of a pulse width of the fourth control single for the fourth switch.

(Supplementary Note 10)

The uninterruptible power supply apparatus described in any one of Supplementary notes 1 to 9, wherein a power failure of the AC power supply is not solved even when a fixed time that is determined in advance as a shutdown instruction time has elapsed after the processor detects a power failure of the AC power supply and switches to a feeding operation from the secondary battery, instead of from the AC power supply, to the load, the processor transmits a shutdown instruction signal to the load and thereby urges the load to shut down.

(Supplementary Note 11)

A control method for an uninterruptible power supply apparatus according to the present invention comprises at least:

a step of performing, by a first switch, an on/off action with a predetermined pulse width for a first DC power-supply voltage based on a first control signal supplied from a driver and thereby outputting as a second DC power-supply voltage having a sawtooth wave shape, or turning off the first switch and thereby cutting off an output;

a step of dropping, by a second switch, the second DC power-supply voltage to a ground potential based on a second control signal supplied from the driver, or smoothing the second DC power-supply voltage and feeding the smoothed DC power-supply voltage as an output DC power-supply voltage to a load side;

a step of performing, by a third switch, an on/off action with a specified pulse width for the first DC power-supply voltage based on a third control signal supplied from the driver and thereby outputting as a third DC power-supply voltage having a sawtooth wave shape, or turning off the third switch and thereby cutting off an output; and a step of performing, by a fourth switch, an on/off action with a specified pulse width for a battery voltage output from a secondary battery based on a fourth control signal supplied from the driver and thereby outputting as the second DC power-supply voltage, instead of or together with the first DC power-supply voltage, to an output side of the first switch, or turning off the fourth switch and thereby cutting off an output.

The above-described supplementary notes are for solving the above-described problem. Further, a first object is to provide an uninterruptible power supply apparatus and its control method capable of improving the conversion efficiency of the power-supply apparatus by adopting a circuit configuration in which the power failure determination of the commercial alternating-current power supply is unified with the deterioration detection/charge control of the secondary battery, and thereby reusing electric power consumed for the deterioration detection of the secondary battery.

Further, a second object is to provide an uninterruptible power supply apparatus and its control method capable of reducing the number of necessary components and improving the power conversion amount per volume by eliminating the selector 1007 used in the uninterruptible power supply apparatus shown in FIG. 8 and by using the same switch as both the switch used in the DC-DC conversion circuit 1008 and the switch used in the deterioration detection/charge control circuit 1005.

According to the above-described supplementary notes, the following advantageous effects can be obtained.

That is, it is possible to reuse electric power that is consumed to measure the characteristic of a secondary battery, which deteriorates with time, and supply the reused electric power to the load side, and thereby to realize an uninterruptible power supply apparatus and its control method having high conversion efficiency.

Further, by eliminating the selector 1007 in the technique shown in FIG. 8 and by using the same switch as both the switch used for the DC-DC conversion circuit and the switch for the charging control, the number of necessary components can be reduced, and thus making it possible to realize an uninterruptible power supply apparatus and its control method having a high power conversion amount per volume.

Further, it is possible to minimize the number of switches and the circuit size of analog-digital converter circuit necessary for the charging of the secondary battery, the deterioration measurement, and the DC-DC conversion operation, and thereby to realize an uninterruptible power supply apparatus and its control method having low cost and excellent volume efficiency.

Further, since electric power that is used for the deterioration measurement of a secondary battery can be reused, it is possible to realize an uninterruptible power supply apparatus and its control method having high operation efficiency.

Further, in the case where the secondary battery is formed by using a battery pack composed of a plurality of battery cells, it is possible to realize an uninterruptible power supply apparatus and its control method capable of continuing the operation even when there is a characteristic difference among each of the battery cells and/or capable of identifying a battery cell having a poor characteristic and urging the replacement thereof.

This application is based upon and claims the benefit of priority from Japanese patent application No. 2011-97934, filed on Apr. 26, 2011, the disclosure of which is incorporated herein in its entirety by reference.

INDUSTRIAL APPLICABILITY

The present invention can be applied to an uninterruptible power supply apparatus equipped with a secondary battery and thereby capable of continuing the supply of electric power even when a temporary power failure occurs.

REFERENCE SIGNS LIST

101 PROCESSOR
102 DRIVER
103 FIRST ANALOG-DIGITAL CONVERTER CIRCUIT
104 SECOND ANALOG-DIGITAL CONVERTER CIRCUIT
105 THIRD ANALOG-DIGITAL CONVERTER CIRCUIT
111 FIRST SWITCH
112 SECOND SWITCH
113 THIRD SWITCH
114 FOURTH SWITCH
120 BATTERY
121 CAPACITOR
130 CONTROL SIGNAL
140 INDUCTANCE
160 FIRST DC POWER-SUPPLY VOLTAGE
161 SECOND DC POWER-SUPPLY VOLTAGE
162 THIRD DC POWER-SUPPLY VOLTAGE
163 OUTPUT DC POWER-SUPPLY VOLTAGE
171 FIRST CONTROL SIGNAL
172 SECOND CONTROL SIGNAL
173 THIRD CONTROL SIGNAL
174 FOURTH CONTROL SIGNAL
183 FIRST DIGITAL SIGNAL
184 SECOND DIGITAL SIGNAL
185 THIRD DIGITAL SIGNAL
197 FIRST GROUND POTENTIAL
198 SECOND GROUND POTENTIAL
199 THIRD GROUND POTENTIAL
200 INPUT CONTROL SIGNAL
201 OUTPUT STATUS SIGNAL
300, 301, 302, 303 BATTERY CELL (SECONDARY BATTERY)
310 SELECTOR
320 SELECT CONTROL SIGNAL
330 OUTPUT BATTERY VOLTAGE
340, 341, 342, 343 BATTERY VOLTAGE
1001 COMMERCIAL ALTERNATING-CURRENT POWER SUPPLY (AC POWER SUPPLY)
1002 FILTER
1003 AC-DC CONVERTER CIRCUIT
1004 POWER-FAILURE DETERMINATION CIRCUIT
1005 DETERIORATION DETECTION/CHARGE CONTROL CIRCUIT
1006 SECONDARY BATTERY
1007 SELECTOR
1008 FIRST DC-DC CONVERTER CIRCUIT
1009 SECOND DC-DC CONVERTER CIRCUIT
1010 THIRD DC-DC CONVERTER CIRCUIT
1011, 1012, 1013 DC POWER-SUPPLY VOLTAGE
1014 POWER-FAILURE DETERMINATION SIGNAL
1015 DC POWER-SUPPLY VOLTAGE
1016, 1017, 1018 OUTPUT DC POWER-SUPPLY VOLTAGE
T1 SECONDARY BATTERY FEED START TIME
T2 AC POWER SUPPLY FEED RECOVERY TIME
t51, t52, t53, t54, t55 TIME
t61, t62, t63, t64, t65 TIME
t71, t72, t73, t74 TIME
TB TIME INTERVAL
TB1 FIRST TIME INTERVAL
TB2 SECOND TIME INTERVAL
TB3 THIRD TIME INTERVAL
TB4 FOURTH TIME INTERVAL
TS SHUTDOWN INSTRUCTION TIME

The invention claimed is:
1. An uninterruptible power supply apparatus according to the present invention comprising at least:
an AC-DC converter circuit that receives AC power supply, converts the received AC power supply into a DC power-supply voltage, and outputs the converted DC power-supply voltage as a first DC power-supply voltage;
a first switch that performs an on/off action with a predetermined pulse width for the first DC power-supply voltage output from the AC-DC converter circuit based on a first control signal supplied from a driver and thereby outputs as a second DC power-supply voltage having a sawtooth wave shape, or becomes an off-state and thereby cuts off an output;
a smoothing circuit that smoothes the second DC power-supply voltage and feeds the smoothed DC power-supply voltage as an output DC power-supply voltage to a load side, the smoothing circuit comprising an inductance and a capacitor;
a second switch that becomes an on-state based on a second control signal supplied from the driver, drops the second DC power-supply voltage to a ground potential, and thereby stops outputting the second DC power-supply voltage to the smoothing circuit, or becomes an off-state and thereby outputs the second DC power-supply voltage to the smoothing circuit;
a third switch that performs an on/off action with a specified pulse width for the first DC power-supply voltage output from the AC-DC converter circuit based on a third control signal supplied from the driver and thereby out- puts as a third DC power-supply voltage having a sawtooth wave shape, or becomes an off-state and thereby cuts off an output;

a fourth switch that performs an on/off action with a specified pulse width for a battery voltage output from a secondary battery based on a fourth control signal supplied from the driver and thereby outputs as the second DC power-supply voltage, instead of or together with the first DC power-supply voltage output from the AC-DC converter circuit, to an output side of the first switch, or becomes an off-state and thereby cuts off an output, the secondary battery being connected between an output side of the third switch and a ground potential;

a first analog-digital converter circuit that converts a voltage value of the output DC power-supply voltage into a first digital signal;

a second analog-digital converter circuit that converts a voltage value of the battery voltage into a second digital signal;

a third analog-digital converter circuit that converts a voltage value of the first DC power-supply voltage into a third digital signal; and a processor that generates a control signal for the driver based on the first to third digital signals output from the first to third analog-digital converter circuits and an externally-supplied input control signal, outputs the generated control signal to the driver, and thereby makes the driver output the first to fourth control signals to the first to fourth switches.

2. The uninterruptible power supply apparatus according to claim 1, wherein the secondary battery is formed by connecting M battery packs (M: positive integer) each composed of N series-connected battery cells (N: positive integer) in parallel, or connecting N battery packs each composed of M parallel-connected battery cells in series.

3. The uninterruptible power supply apparatus according to claim 2, further comprising a selector that selects one of power-supply lines connected to outputs of respective battery cells according to a select control signal output from the processor, and connects the selected power-supply line to the second analog-digital converter circuit, wherein the processor generates the select control signal and outputs the generated select control signal to the selector.

4. The uninterruptible power supply apparatus according to claim 1, wherein the first to fourth switches comprise a semiconductor switch.

5. The uninterruptible power supply apparatus according to claim 1, wherein the processor changes to a secondary battery inspection state at a fixed cycle that is determined in advance as a battery inspection cycle, and thereby periodically performs an operation for inspecting a deterioration state of the secondary battery while continuing a feeding operation to the load side by the first power-supply voltage output from the first switch.

6. The uninterruptible power supply apparatus according to claim 5, wherein in the secondary battery inspection state, the processor, at a predetermined time interval, gradually increases/decreases a pulse width of the third or fourth control signal in a predetermined sine-wave shape or stops an output, and thereby gradually increases/decreases an on-time of the third or fourth switch in the sine-wave shape, or controls the third or fourth switch into an off-state, and reads the second digital signal output from the second analog-digital converter circuit, and by doing so, the processor measures whether or not a voltage value of the battery voltage output from each battery cell of the secondary battery or a battery pack constituting the secondary battery is output as a voltage value that changes in a sine-wave shape at a predetermined cycle.

7. The uninterruptible power supply apparatus according to claim 6, wherein as the predetermined time interval, the predetermined cycle is divided into four time intervals including first to fourth time intervals, and in the first time interval, a pulse width of the third control signal for the third switch is gradually decreased in a sine-wave shape and an output of the fourth control signal for the fourth switch is set to a logic level "0", in the second time interval, a pulse width of the fourth control signal for the fourth switch is gradually increased in a sine-wave shape and an output of the third control signal for the third switch is set to a logic level "0", in the third time interval, the pulse width of the fourth control signal for the fourth switch is gradually decreased in a sine-wave shape and the output of the third control signal for the third switch is set to a logic level "0", and in the fourth time interval, the pulse width of the third control signal for the third switch is gradually increased in a sine-wave shape and the output of the fourth control signal for the fourth switch is set to a logic level "0".

8. The uninterruptible power supply apparatus according to claim 6, wherein in the secondary battery inspection state, the driver sets a pulse phase of the fourth control signal for the fourth switch based on a control signal supplied from the processor so that an on-time of the first switch does not overlap an on-time of the fourth switch.

9. The uninterruptible power supply apparatus according to claim 6, wherein in the secondary battery inspection state, the driver thins out some of pulses of the first control single for the first switch or narrows a pulse width of the first control signal, based on a control signal supplied from the processor, so as to correspond to a change of a pulse width of the fourth control single for the fourth switch.

10. A control method for an uninterruptible power supply apparatus according to the present invention comprises at least:

performing, by a first switch, an on/off action with a predetermined pulse width for a first DC power-supply voltage based on a first control signal supplied from a driver and thereby outputting as a second DC power-supply voltage having a sawtooth wave shape, or turning off the first switch and thereby cutting off an output;

dropping, by a second switch, the second DC power-supply voltage to a ground potential based on a second control signal supplied from the driver, or smoothing the second DC power-supply voltage and feeding the smoothed DC power-supply voltage as an output DC power-supply voltage to a load side;

performing, by a third switch, an on/off action with a specified pulse width for the first DC power-supply voltage based on a third control signal supplied from the driver and thereby outputting as a third DC power-supply voltage having a sawtooth wave shape, or turning off the third switch and thereby cutting off an output; and performing, by a fourth switch, an on/off action with a specified pulse width for a battery voltage output from a secondary battery based on a fourth control signal supplied from the driver and thereby outputting as the second DC power-supply voltage, instead of or together with the first DC power-supply voltage, to an output side of the first switch, or turning off the fourth switch and thereby cutting off an output.

* * * * *